United States Patent
Li et al.

(10) Patent No.: US 12,431,496 B2
(45) Date of Patent: Sep. 30, 2025

(54) SECONDARY BATTERY, PREPARATION METHOD THEREOF, AND BATTERY MODULE, BATTERY PACK, AND APPARATUS CONTAINING SUCH SECONDARY BATTERY

(71) Applicant: CONTEMPORARY AMPEREX TECHNOLOGY (HONG KONG) LIMITED, Hong Kong (CN)

(72) Inventors: Erling Li, Ningde (CN); Meng Kang, Ningde (CN); Baida Deng, Ningde (CN); Libing He, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 444 days.

(21) Appl. No.: 18/059,953

(22) Filed: Nov. 29, 2022

(65) Prior Publication Data
US 2023/0117662 A1 Apr. 20, 2023

Related U.S. Application Data

(63) Continuation of application No. PCT/CN2020/121255, filed on Oct. 15, 2020.

(51) Int. Cl.
*H01M 4/505* (2010.01)
*H01M 4/525* (2010.01)
(Continued)

(52) U.S. Cl.
CPC ........... *H01M 4/583* (2013.01); *H01M 4/505* (2013.01); *H01M 4/525* (2013.01); *H01M 2004/021* (2013.01); *H01M 2004/027* (2013.01)

(58) Field of Classification Search
CPC .................................................. H01M 4/366
See application file for complete search history.

(56) References Cited

U.S. PATENT DOCUMENTS

| 2012/0009475 A1 | 1/2012 | Nakura |
| 2012/0328942 A1 | 12/2012 | Thomas-Alyea et al. |

(Continued)

FOREIGN PATENT DOCUMENTS

| CN | 103367749 A | 10/2013 |
| CN | 108807847 A | 11/2018 |

(Continued)

OTHER PUBLICATIONS

The first Office Action received in the corresponding Chinese application 202080083164.9, mailed Mar. 1, 2023.

(Continued)

*Primary Examiner* — Nicholas A Smith
*Assistant Examiner* — Zackary Richard Cochenour
(74) *Attorney, Agent, or Firm* — K&L Gates LLP

(57) ABSTRACT

A secondary battery, a preparation method thereof, and a battery module, a battery pack, and an apparatus containing such secondary battery are provided. In some embodiments, the secondary battery includes a negative-electrode plate, where the negative-electrode plate includes a negative-electrode current collector and a negative-electrode film layer, the negative-electrode film layer includes a first negative-electrode film layer and a second negative-electrode film layer, and the second negative-electrode film layer is located between the negative-electrode current collector and the first negative-electrode film layer; and the first negative-electrode film layer includes a first negative-electrode active material, the first negative-electrode active material includes a first graphite, the first graphite is artificial graphite, and a (Continued)

distribution of volume-based particle size $D_v99$ of the first negative-electrode active material is ≤23 μm.

20 Claims, 3 Drawing Sheets

(51) Int. Cl.
   *H01M 4/583* (2010.01)
   *H01M 4/02* (2006.01)

(56) References Cited

U.S. PATENT DOCUMENTS

| | | | |
|---|---|---|---|
| 2020/0295351 A1* | 9/2020 | Piao | H01M 10/0525 |
| 2021/0111410 A1* | 4/2021 | Huang | H01M 4/133 |
| 2021/0351405 A1* | 11/2021 | Feng | H01M 4/661 |

FOREIGN PATENT DOCUMENTS

| | | | | |
|---|---|---|---|---|
| CN | 109841831 A | 6/2019 | | |
| CN | 110867560 A | 3/2020 | | |
| CN | 110870115 A | 3/2020 | | |
| CN | 110931788 A | 3/2020 | | |
| CN | 111129502 A | 5/2020 | | |
| CN | 111540881 A | 8/2020 | | |
| CN | 111600066 A | 8/2020 | | |
| CN | 111668452 A | 9/2020 | | |
| JP | 2014199714 A | 10/2014 | | |
| JP | 2015082381 A | 4/2015 | | |
| JP | 2019508839 A | 3/2019 | | |
| JP | 2021536104 A | 12/2021 | | |
| KR | 1020180004587 A | 1/2018 | | |
| KR | 1020190042299 A | 4/2019 | | |
| WO | 2011109815 A1 | 9/2011 | | |
| WO | 2018225515 A1 | 12/2018 | | |
| WO | WO-2020042571 A1 * | 3/2020 | | H01M 10/0525 |
| WO | 2020187106 A1 | 9/2020 | | |

OTHER PUBLICATIONS

Notice of Reasons for Refusal received in the corresponding Japanese application 2022-549890, mailed Aug. 29, 2023.
The first Office Action received in the corresponding European application 20957149.6, mailed Nov. 21, 2024.
The first Office Action received in the corresponding Korean application 10-2022-7027436, mailed Sep. 27, 2024.
The extended European search report received in the corresponding European application 20957149.6, mailed Feb. 6, 2024.
International Search Report received in the corresponding International Application PCT/CN2011/109815, mailed Jun. 30, 2021.
Written Opinion received in the corresponding International Application PCT/CN2011/109815, mailed Jun. 30, 2021.

* cited by examiner

SECONDARY BATTERY, PREPARATION METHOD THEREOF, AND BATTERY MODULE, BATTERY PACK, AND APPARATUS CONTAINING SUCH SECONDARY BATTERY

CROSS-REFERENCE TO RELATED APPLICATIONS

This application is a continuation of International Application PCT/CN2020/121255, filed Oct. 15, 2020 and entitled "SECONDARY BATTERY, PREPARATION METHOD THEREOF, AND BATTERY MODULE, BATTERY PACK, AND APPARATUS CONTAINING SUCH SECONDARY BATTERY", which is incorporated herein by reference in its entirety.

TECHNICAL FIELD

This disclosure relates to the field of secondary battery technologies, and in particular, to a secondary battery, a preparation method thereof, and a battery module, a battery pack, and an apparatus containing such secondary battery.

BACKGROUND

Secondary batteries are charged and discharged through repeated intercalation and deintercalation of active ions between a positive electrode and a negative electrode, featuring outstanding features such as high energy density, long cycle life, no pollution, and no memory effect. Therefore, as clean energy, the secondary batteries have been gradually popularized from electronic products to large-scale apparatuses such as electric vehicles to adapt to sustainable development strategies of environment and energy.

However, compared with conventional oil-fueled vehicles that can be refueled quickly in a timely manner, the electric vehicles are generally charged at a smaller rate, often requiring a longer charging time. This causes range anxiety for consumers and limits rapid popularization of the electric vehicles. Therefore, in order to improve market competitiveness of the electric vehicles, it is necessary to provide secondary batteries with good fast-charging performance.

SUMMARY

Various embodiments in accordance with this disclosure provide a secondary battery, a preparation method thereof, and a battery module, a battery pack, and an apparatus containing such secondary battery, so as to implement both good fast charging performance and cycling performance of the battery under the premise of a higher energy density.

In order to achieve the foregoing inventive objectives, a first aspect of this disclosure provides a secondary battery, which includes a negative-electrode plate, and the negative-electrode plate includes a negative-electrode current collector and a negative-electrode film layer, the negative-electrode film layer includes a first negative-electrode film layer and a second negative-electrode film layer, and the second negative-electrode film layer is located between the negative-electrode current collector and the first negative-electrode film layer; and the first negative-electrode film layer includes a first negative-electrode active material, the first negative-electrode active material includes a first graphite, the first graphite is artificial graphite, and a distribution of volume-based particle size $D_v99$ of the first negative-electrode active material is ≤23 μm.

The secondary battery of this disclosure uses a negative-electrode plate of a multi-layer film structure, and the first negative-electrode film layer located at an upper layer includes the first negative-electrode active material, satisfying the first negative-electrode active material including the first graphite, the first graphite being artificial graphite, and $D_v99$ of the first negative-electrode active material being ≤23 μm. In this way, in a high SOC (State of Charge, state of charge) state of the battery, the negative-electrode plate can also have a good electrochemical reaction interface and a higher solid-phase diffusion speed of active ions, so that the battery can be charged at a high rate in the high SOC state, significantly improving a fast-charging capability.

In any implementation of this disclosure, the first negative-electrode active material satisfies 17 μm≤$D_v99$≤23 μm; optionally, 18 μm≤$D_v99$≤21 μm. The first negative-electrode active material with $D_v99$ being within an appropriate range enables the secondary battery to have a higher energy density and also improve the fast-charging capability and cycling performance through reduction of solid-phase conduction impedance.

In any implementation of this disclosure, the first negative-electrode active material satisfies 8 μm≤$D_v50$≤13 μm; optionally, 9 μm≤$D_v50$≤12 μm. The first negative-electrode active material with $D_v50$ being within an appropriate range shortens a migration and diffusion path of active ions, and can further improve the fast-charging capability and cycling performance of the battery.

In any implementation of this disclosure, a particle size uniformity of the first negative-electrode active material is 0.28-0.4, optionally, 0.30-0.36. When the particle size uniformity of the first negative-electrode active material falls within the foregoing range, active particles can be properly matched, improving processing performance, further improving the fast charging ability and cycling performance of the battery, and also improving an energy density of the battery.

In any implementation of this disclosure, secondary particles are included in the first graphite. Optionally, a number percentage of the secondary particles in the first graphite is ≥50%. Optionally, a number percentage of the secondary particles in the first graphite is 80%-100%. When the first negative-electrode active material includes a larger quantity of secondary particles, isotropy of the active particles is improved, and an intercalation path of active ions is shortened, thereby further improving the fast-charging capability of the battery and also improving the cycling performance.

In any implementation of this disclosure, a particle size specific surface area of the first negative-electrode active material is 0.45 m²/g-0.65 m²/g, optionally, 0.5 m²/g-0.63 m²/g. The negative-electrode active material with the particle size specific surface area being within an appropriate range can further improve the fast charging performance, cycling performance and energy storage performance of the battery.

In any implementation of this disclosure, the first negative-electrode active material satisfies 0.6≤($D_v90$-$D_v10$)/$D_v50$≤1.8, optionally, 0.8≤($D_v90$-$D_v10$)/$D_v50$≤1.4.

The first negative-electrode active material with ($D_v90$-$D_v10$)/$D_v50$ being within an appropriate range helps form a smooth pore structure in the film layer. This helps rapid transmission of active ions and reduces liquid-phase conduction impedance, thereby further improving the fast-charging capability and cycling performance of the battery.

In some implementations, a distribution of volume-based particle size $D_v10$ of the first negative-electrode active material is 5 μm-9 μm, optionally, 6 μm-8 μm. The first negative-electrode active material with $D_v10$ being within an appropriate range can reduce irreversible consumption of active ions and improve a mass of the active material per unit volume. This helps increase the energy density, cycling performance, and high-temperature energy storage performance of the battery.

In some implementations, a distribution of volume-based particle size $D_v90$ of the first negative-electrode active material is 14 μm-21 μm, optionally, 16 μm-18 μm. The first negative-electrode active material with $D_v90$ being within an appropriate range can further improve the fast-charging capability and cycling performance of the battery.

In any implementation of this disclosure, a powder OI value of the first negative-electrode active material is 2.0-4.0, optionally, 2.3-3.6. The first negative-electrode active material with the powder OI value being within an appropriate range enables a larger quantity of active ion to rapidly intercalate into a channel, thereby further improving the fast-charging capability of the battery. The first negative-electrode active material with the powder OI value being within an appropriate range can also reduce an expansion effect of the negative-electrode plate during charging, further improving the cycling performance of the battery.

In some implementation in accordance with this disclosure, a tap density of the first negative-electrode active material is 0.85 g/cm$^3$-1.4 g/cm$^3$, optionally, 0.9 g/cm$^3$-1.2 g/cm$^3$. The first negative-electrode active material with the tap density being within the given range helps maintain good contact between particles to obtain a better inter-particle spacing structure, ensuring a smooth active ion transmission channel, and enabling the battery to obtain a higher fast-charging capability and energy density.

In some implementation in accordance with this disclosure, a powder compacted density of the first negative-electrode active material under a pressure of 2 kN is 1.55 g/cm$^3$-1.70 g/cm$^3$, optionally, 1.58 g/cm$^3$-1.68 g/cm$^3$. The first negative-electrode active material with the powder compacted density under the pressure of 2 kN being within the given range enables the negative-electrode film layer to have a higher compacted density, thereby improving the energy density of the battery.

In some implementation in accordance with this disclosure, a specific surface area (SSA) of the first negative-electrode active material is 0.8 m$^2$/g-1.3 m$^2$/g, optionally, 0.9 m$^2$/g-1.2 m$^2$/g. The first negative-electrode active material with the specific surface area (SSA) being within an appropriate range improves infiltration of the electrolyte and liquid-phase transmission of active ions. This helps the battery to obtain a higher fast-charging capability and cycling performance.

In some implementation in accordance with this disclosure, a gram capacity of the first negative-electrode active material is 345 mAh/g-360 mAh/g, optionally, 350 mAh/g-358 mAh/g. The first negative-electrode active material with the gram capacity being within the foregoing range can increase the energy density and fast-charging capability of the battery.

In some implementation in accordance with this disclosure, at least part of a surface of the first graphite is provided with an amorphous carbon coating layer. A carbon layer with active ions accumulated is formed on the surface of the first graphite, reducing a charge transfer resistance. With the first graphite, the cycling performance and fast-charging capability of the battery can be further improved.

In some implementation in accordance with this disclosure, a mass percentage of the first graphite in the first negative-electrode active material is ≥80%. Optionally, the mass percentage of the first graphite in the first negative-electrode active material is 90%-100%. The first negative-electrode film layer including a larger amount of first graphite can more effectively improve the fast-charging capability of the battery.

In some implementation in accordance with this disclosure, the second negative-electrode film layer includes a second negative-electrode active material, the second negative-electrode active material includes second graphite, and the second graphite includes one or more of artificial graphite and natural graphite.

In some implementation in accordance with this disclosure, a mass percentage of the artificial graphite in the second graphite is ≥50%. Optionally, the mass percentage of the artificial graphite in the second graphite is 60%-100%. The second negative-electrode active material including a larger amount of artificial graphite can increase the energy density of the battery, and can improve the cycling performance and high-temperature energy storage performance of the battery.

In some implementation in accordance with this disclosure, a distribution of volume-based particle size $D_v99$ of the second negative-electrode active material is greater than the volume-based particle size distribution $D_v99$ of the first negative-electrode active material. Optionally, a ratio of the volume-based particle size distribution $D_v99$ of the second negative-electrode active material to the volume-based particle size distribution $D_v99$ of the first negative-electrode active material is 2.0-2.6, further optionally, 2.1-2.4. The second negative-electrode active material and the first negative-electrode active material satisfying the foregoing conditions can increase the energy density, cycling performance, and energy storage performance of the battery, and also enable the battery to have a higher fast-charging capability.

In some implementation in accordance with this disclosure, a volume-based median particle size $D_v50$ of the second negative-electrode active material is 15 μm-21 μm, optionally, 16.5 μm-20 μm. The second negative-electrode active material with $D_v50$ being within the foregoing range shortens a diffusion path of active ions and enables the second negative-electrode active material to have a higher gram capacity, so that the battery can have higher fast-charging capability, energy density, and cycling performance.

In some implementation in accordance with this disclosure, the second graphite includes primary particles. Optionally, a number percentage of the primary particles in the second graphite is ≥50%, optionally, the quantity proportion of the primary particles in the second graphite is 60%-100%. The second graphite satisfies the foregoing condition, so that the material has higher anisotropy, ensuring structural stability of the graphite and improving the compacted density of the negative-electrode film layer. This can improve the energy density, high temperature energy storage performance, and cycling performance of the battery.

In some implementation in accordance with this disclosure, a particle size uniformity of the second negative-electrode active material is 0.3-0.55, optionally, 0.4-0.5. The second negative-electrode active material with the particle size uniformity being within the foregoing range can further improve the cycling performance and energy density of the battery.

In some implementation in accordance with this disclosure, a particle size specific surface area of the first negative-electrode active material is 0.35 m$^2$/g-0.55 m$^2$/g, optionally, 0.38 m$^2$/g-0.50 m$^2$/g. The second negative-electrode active material with the particle size specific surface area being within the foregoing range reduces irreversible consumption of active ions, and can further improve the cycling performance and energy storage performance of the battery.

In some implementation in accordance with this disclosure, the second negative-electrode active material satisfies $0.9 \leq (D_v90-D_v10)/D_v50 \leq 1.6$, optionally, $1.0 \leq (D_v90-D_v10)/D_v50 \leq 1.4$. The second negative-electrode active material with $(D_v90-D_v10)/D_v50$ being within the foregoing range maintains an appropriate pore structure between particles, and can improve the fast charging performance and volumetric energy density of the battery.

In some implementation in accordance with this disclosure, a distribution of volume-based particle size $D_v10$ of the second negative-electrode active material is 5 μm-14 μm, optionally, 7 μm-12 μm. The second negative-electrode active material with $D_v10$ being within the foregoing range can improve the cycling performance and energy storage performance of the battery.

In some implementation in accordance with this disclosure, a distribution of volume-based particle size $D_v90$ of the second negative-electrode active material is 24 μm-38 μm, optionally, 26 μm-33 μm. The second negative-electrode active material with $D_v90$ being within the foregoing range can improve the cycling performance and fast-charging capability of the battery, and can further increase the energy density of the battery.

In some implementation in accordance with this disclosure, a powder OI value of the second negative-electrode active material is ≤14, optionally, 6-11. The second negative-electrode active material with the OI value being within the foregoing range helps shorten an intercalation path of active ions, and reduces expansion of the battery during charging, so that the battery has a higher fast-charging capability, cycling performance, and energy density.

In some implementation in accordance with this disclosure, a tap density of the second negative-electrode active material is 0.8 g/cm³-1.2 g/cm³, optionally, 0.9 g/cm³-1.1 g/cm³. The second negative-electrode active material with the tap density being within the foregoing range maintains an excellent pore structure between active particles, thereby improving the fast-charging capability and the energy density of the battery.

In some implementation in accordance with this disclosure, a powder compacted density of the second negative-electrode active material under a pressure of 2 kN is 1.70 g/cm³-1.85 g/cm³, optionally, 1.75 g/cm³-1.82 g/cm³. The second negative-electrode active material with the powder compacted density under the pressure of 2 kN being within an appropriate range improves the compacted density of the negative-electrode film layer, thereby improving the energy density of the battery.

In some implementation in accordance with this disclosure, a specific surface area (SSA) of the second negative-electrode active material is 1.0 m²/g-2.0 m²/g, optionally, 1.3 m²/g-1.8 m²/g. The second negative-electrode active material with the specific surface area (SSA) being within an appropriate range helps the battery to obtain higher energy storage performance and cycling performance.

In some implementation in accordance with this disclosure, a gram capacity of the second negative-electrode active material is 353 mAh/g-370 mAh/g, optionally, 359 mAh/g-367 mAh/g. The second negative-electrode active material with the gram capacity being within the foregoing range can increase the energy density of the battery, and further improve the cycling performance of the battery.

In some implementation in accordance with this disclosure, an areal density of the negative-electrode film layer is 0.117 mg/mm²-0.130 mg/mm², optionally, 0.120 mg/mm²-0.127 mg/mm². The negative-electrode film layer with the areal density being within the foregoing range can further increase the energy density and fast-charging capability of the battery.

In some implementation in accordance with this disclosure, a compacted density of the negative-electrode film layer is 1.65 g/cm³-1.75 g/cm³, optionally, 1.66 g/cm³-1.70 g/cm³. The negative-electrode film layer with the compacted density being within the given range can further increase the energy density, fast-charging capability, and cycling performance of the battery.

In some implementation in accordance with this disclosure, a thickness ratio of the second negative-electrode film layer to the first negative-electrode film layer is 0.7:1-2.3:1, optionally, 0.7:1-1.0:1, and further optionally, 1.1:1-2.3:1. The thickness ratio of the second negative-electrode film layer to the first negative-electrode film layer being within an appropriate range can further improve the fast-charging capability or energy density of the battery.

In some implementation in accordance with this disclosure, the first negative-electrode active material or the second negative-electrode active material further includes one or more of silicon-based material, tin-based material, soft carbon, hard carbon, and lithium titanate.

In some implementation in accordance with this disclosure, the secondary battery includes a positive-electrode plate, the positive-electrode plate includes a positive-electrode current collector and a positive-electrode film layer that is disposed on at least one surface of the positive-electrode current collector and that includes a positive-electrode active material, the positive-electrode active material includes one or more of lithium transition metal oxide, olivine-structured lithium-containing phosphate, and respective modified compounds thereof. Optionally, the positive-electrode active material includes one or more of lithium transition metal oxides shown in Formula 1 and modified compounds thereof.

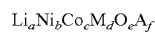

$\mathrm{Li}_a\mathrm{Ni}_b\mathrm{Co}_c\mathrm{M}_d\mathrm{O}_e\mathrm{A}_f$           Formula 1

In Formula 1, $0.8 \leq a \leq 1.2$, $0.5 \leq b \leq 1$, $0 \leq c \leq 1$, $0 \leq d \leq 1$, $1 \leq e \leq 2$, or $0 \leq f \leq 1$, where M is selected from one or more of Mn, Al, Zr, Zn, Cu, Cr, Mg, Fe, V, Ti, and B; and A is selected from one or more of N, F, S, and Cl.

A second aspect of this disclosure provides a preparation method of a secondary battery, including at least the following steps: forming a second negative-electrode film layer on at least one side of a negative-electrode current collector, where the second negative-electrode film layer includes a second negative-electrode active material; and forming a first negative-electrode film layer on a surface of the second negative-electrode film layer, where the first negative-electrode film layer includes a first negative-electrode active material; where the first negative-electrode active material includes first graphite, the first graphite is artificial graphite, and a distribution of volume-based particle size $D_v99$ of the first negative-electrode active material is ≤23 μm.

A third aspect of this disclosure provides a battery module, including the secondary battery in this disclosure.

A fourth aspect of this disclosure provides a battery pack, including the secondary battery or the battery module in this disclosure.

A fifth aspect of this disclosure provides an apparatus, including at least one of the secondary battery, the battery module, or the battery pack in this disclosure.

The battery module, the battery pack, and the apparatus in this disclosure include the secondary battery provided in this disclosure, and therefore have at least effects that are the same as those of the secondary battery.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and a person of ordinary skill in the art may still derive other drawings from the accompanying drawings without creative efforts.

DETAILED DESCRIPTION OF EMBODIMENTS

Figure 1:
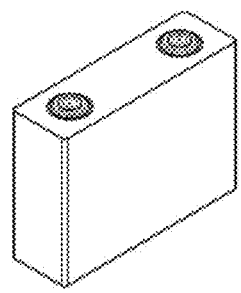
FIG. 1 is a schematic diagram of a secondary battery according to an embodiment of this disclosure.

In order to make the objectives, technical solutions and beneficial technical effects of this disclosure clearer, the following further describes this disclosure in detail with reference to the embodiments. It should be understood that the embodiments described in this specification are merely intended to interpret this disclosure, but not intended to limit this disclosure.

For simplicity, only some numerical ranges are expressly disclosed in this specification. However, any lower limit may be combined with any upper limit to form a range not expressly recorded; any lower limit may be combined with any other lower limit to form a range not expressly recorded; and any upper limit may be combined with any other upper limit to form a range not expressly recorded. In addition, although not expressly recorded, each point or individual value between endpoints of a range is included in the range. Therefore, each point or individual value may act as its own lower limit or upper limit to be combined with any other point or individual value or combined with any other lower limit or upper limit to form a range not expressly recorded.

In the description of this specification, it should be noted that, unless otherwise stated, "above" and "below" means inclusion of the number itself, and "more" in "one or more" means at least two.

As used herein, unless otherwise stated, the term "or" indicates inclusion. For example, a phrase "A or B" means "A, B, or both A and B". More In some embodiments, any one of the following conditions satisfies the condition "A or B": A is true (or present) and B is false (or not present); A is false (or not present) and B is true (or present); or both A and B are true (or present).

It should be understood that relational terms such as "first" and "second" are used only to differentiate an entity or operation from another entity or operation, and do not require or imply that any actual relationship or sequence exists between these entities or operations.

The foregoing invention content of this disclosure is not intended to describe each of the disclosed embodiments or implementations of this disclosure. The following description illustrates exemplary embodiments in more detail by using examples. Throughout this disclosure, guidance is provided by using a series of embodiments and the embodiments may be used in various combinations. In each instance, enumeration is only representative but should not be interpreted as exhaustive.

[Secondary Battery]

A secondary battery, also referred to as a rechargeable battery or a storage battery, is a battery that can be charged after being discharged to activate active materials for continuous use.

Generally, a secondary battery includes a positive-electrode plate, a negative-electrode plate, a separator, and an electrolyte. During charging and discharging of the battery, active ions (for example, lithium ions) are intercalated and deintercalated back and forth between the positive-electrode plate and the negative-electrode plate. The separator is provided between the positive-electrode plate and the negative-electrode plate, mainly plays a role of preventing short-circuits of the positive and negative electrodes, and allows ions to pass through. The electrolyte is between the positive-electrode plate and the negative-electrode plate, and mainly plays a role of conducting ions.

[Negative-Electrode Plate]

The secondary battery includes a negative-electrode plate, and the negative-electrode plate generally includes a negative-electrode current collector and a negative-electrode film layer disposed on at least one side of the negative-electrode current collector.

The inventor(s) has found that a key to improving the fast-charging capability of the secondary battery is to improve kinetic performance of the negative electrode. At present, kinetic performance of the negative electrode is mostly improved by thinning the negative-electrode film layer or reducing a compacted density of the negative-electrode film layer. However, it has been proved through a lot of researches that in the foregoing methods for improving negative-electrode kinetics, only kinetics of the battery in a low SOC state (that is, in an initial charging phase) is improved to some extent while improvement on kinetics performance of the battery in a high SOC state (that is, in a later charging phase) is not obvious. Therefore, the fast-charging capability of the secondary battery cannot be effectively improved, and the secondary battery cannot be actually charged at a high rate. In addition, the energy density of the battery is also significantly decreased.

The inventor(s) has further carried out a lot of researches, and skillfully improved composition of the negative-electrode film layer, breaking the foregoing bottleneck. In some embodiments, in the secondary battery of this disclosure, the negative-electrode plate includes a negative-electrode current collector and a negative-electrode film layer, the negative-electrode film layer includes a first negative-electrode film layer and a second negative-electrode film layer, and the second negative-electrode film layer is located between the negative-electrode current collector and the first negative-electrode film layer; and the first negative-electrode film layer includes a first negative-electrode active material, the first negative-electrode active material includes a first graphite, the first graphite is artificial graphite, and a distribution of volume-based particle size $D_v99$ of the first negative-electrode active material is ≤23 μm. The secondary battery of this disclosure uses a negative-electrode plate of a multi-layer film structure, and the first negative-electrode film layer located at an upper layer includes the first negative-electrode active material, satisfying the first negative-electrode active material including the first graphite, the first graphite being artificial graphite, and $D_v99$ of the first negative-electrode active material being less than or equal to 23 μm. In this way, in a high SOC state of the battery, the negative-electrode plate can also have a higher diffusion speed of active ions, effectively improving a fast-charging capability.

Absent from any theoretical restriction, $D_v99$ of the negative-electrode active material has always been considered insignificant by the industry and difficult to control parameters, and thus has been neglected. The inventor(s) has found for the first time in the research process that when the first negative-electrode active material in the first negative-electrode film layer includes the first graphite, the first graphite is artificial graphite, and the first negative-electrode active material satisfies $D_v99$≤23 μm, the negative-electrode plate can maintain a good electrochemical reaction interface even in a later charging phase (with a relatively large amount of active ions intercalated, for example, lithium intercalation amount) and particles of the first negative-electrode active material can have good active ion diffusion performance. The active ions can be quickly intercalated into bulk of the first negative-electrode active material and migrate rapidly, to improve a diffusion rate of active ions in the first negative-electrode film layer at this stage. The active ions can also quickly migrate to the second negative-electrode film layer through the first negative-electrode film layer, and a charging speed and charging depth of the entire negative-electrode plate at this stage are greatly increased, so that the battery can be charged at a high rate in the high SOC state, significantly improving a fast-charging capability. Generally, the low SOC state means being below 30% SOC, and the high SOC state means being above 60% SOC.

The first negative-electrode active material includes the first graphite, the first graphite is artificial graphite, and the first negative-electrode active material satisfies $D_v99$≤23 μm; this can further reduce an ohmic and concentration polarization of the battery being charged in the high SOC state, which further helps improve the cycling performance of the battery.

In some implementations, the first negative-electrode active material may satisfy $D_v99$≤23 μm, ≤22.5 μm, ≤22 μm, ≤21.5 μm, or ≤21 μm. The first negative-electrode active material with $D_v99$ being within the foregoing range can further improve a lithium intercalation speed of the battery in the high SOC state, reduce polarization, and further improve the fast-charging capability and cycling performance of the battery.

In some implementations, $D_v99$ of the first negative-electrode active material is ≥15 μm, ≥16 μm, ≥17 μm, ≥18 μm, ≥19 μm, or ≥19.5 μm. The first negative-electrode active material with $D_v99$ being within the foregoing range enables the first negative-electrode active material to have a higher gram capacity, thereby improving the energy density of the battery. In addition, the first negative-electrode active material with $D_v99$ being within the foregoing range helps reduce smaller particles, more active ions can be intercalated into the particles, a smooth pore structure is formed in the negative-electrode film layer, and a liquid-phase conduction path is shortened, further improving the fast-charging capability and cycling performance of the battery. A reduced content of small particles helps reduce side reaction of the electrolyte at the negative electrode, further improving high-temperature energy storage performance of the battery.

In some optional embodiments, the first negative-electrode active material satisfies: 17 μm≤$D_v99$≤23 μm. For example, the first negative-electrode active material may satisfy 17.5 μm≤$D_v99$≤20.5 μm, 18 μm≤$D_v99$≤21 μm, 18 μm≤$D_v99$≤19 μm, 19 μm≤$D_v99$≤20.5 μm, 19.5 m≤$D_v99$≤21 μm, 20 μm≤$D_v99$≤22 μm, or the like. For example, $D_v99$ may be 22.9 μm, 22.6 μm, 21.7 μm, 21.1 μm, 20.4 μm, 19.9 μm, 19.2 μm, 18.1 μm, or 17.6 μm. With the first negative-electrode active material, the secondary battery can have a higher fast-charging capability, cycling performance, high-temperature energy storage performance, and energy density at the same time.

The inventor(s) has found through in-depth research that when the secondary battery of this disclosure satisfies the foregoing design conditions, if optionally one or more of the following parameters are further satisfied, the performance of the battery can be further improved.

In some implementations, the first negative-electrode active material satisfies: 8 μm≤$D_v50$≤13 μm. Optionally, the $D_v50$ of the first negative-electrode active material is ≤13 μm, ≤12.5 μm, or ≤12 μm. Optionally, the $D_v50$ of the first negative-electrode active material is ≥8 μm, ≥9 μm, ≥10 μm, or ≥11 m. For example, the first negative-electrode active material may satisfy 8.5 μm≤$D_v50$≤10 μm, 9 μm≤$D_v50$≤12 μm, 9.5 μm≤$D_v50$≤11.5 μm, 10 μm≤$D_v50$≤12 μm, 11 m≤$D_v50$≤12 μm, 11 m≤$D_v50$≤12.5 μm, or 11.5 μm≤$D_v50$≤12.8 μm. For example, the $D_v50$ can be 8.6 μm, 9.8 μm, 10.3 μm, 11.2 μm, 11.3 μm, 11.4 μm, 11.5 μm, 11.7 μm, 11.8 μm, 12.4 μm, 12.8 μm, or 14.5 μm.

The first negative-electrode active material with $D_v50$ being within an appropriate range can further shorten a migration path of active ions in particles of the first negative-electrode active material, and helps form a smooth pore structure in the first negative-electrode film layer. In this way, the negative-electrode plate has good liquid-phase transmission performance and a good solid-phase diffusion speed of active ions, thereby further improving the fast-charging capability and cycling performance of the battery. In addition, the first negative-electrode active material with $D_v50$ being within an appropriate range can reduce the side reaction of the electrolyte on the particle surface, and improve the cycling performance and high-temperature energy storage performance of the battery.

In some implementations, a particle size uniformity of the first negative-electrode active material is 0.28-0.4, for example, may be 0.28-0.38, 0.29-0.34, 0.30-0.36, or 0.31-0.35. When the particle size uniformity of the first negative-electrode active material is within the foregoing range, a relatively short liquid-phase transmission path is likely to be formed in the first negative-electrode film layer, and a large contact area is present between the particles. This is good for electron conduction and active ion transmission in the negative-electrode plate, improving the fast-charging capability and cycling performance of the battery. In addition, close contact between the particles of the first negative-electrode film layer can be implemented, so that the negative-electrode plate can have a higher compacted density, thereby improving the energy density of the battery.

It should be noted that the particle size uniformity of the negative-electrode active material may characterize a dispersion degree by which the particle size of all particles of the negative-electrode active material deviates from the volume-based median particle size $D_v50$ of the negative-electrode active material, which can reflect uniformity of particle size distribution of the negative-electrode active material.

In some implementations, the first negative-electrode active material satisfies: $0.6 \leq (D_v90-D_v10)/D_v50 \leq 1.8$. For example, $(D_v90-D_v10)/D_v50$ of the first negative-electrode active material may be 0.8-1.4, 0.9-1.5, or 1.0-1.3. $(D_v90-D_v10)/D_v50$ of the negative-electrode active material reflects a degree by which the particle size of larger particles and the particle size of smaller particles deviate from the volume-based median particle size $D_v50$ in the negative-electrode active material. The first negative-electrode active material with $(D_v90-D_v10)/D_v50$ being within an appropriate range helps improve processing performance of a first negative-electrode slurry and the negative-electrode film layer, so that the first negative-electrode film layer has relatively high particle distribution uniformity and a smooth pore structure. In this way, different areas of the negative-electrode film layer all exhibit relatively high active ion transmission performance, and the fast-charging capability and cycling performance of the battery is further improved.

In some implementations, a distribution of volume-based particle size $D_v90$ of the first negative-electrode active material is 14 μm-21 μm, for example, may be 16 μm-18 μm, 17 μm-19 μm, or 18 μm-20 μm. The first negative-electrode active material with $D_v90$ being within an appropriate range can further improve the solid-phase diffusion speed of active ions in the negative-electrode film layer, thereby further improving the fast-charging capability and cycling performance of the battery. In addition, the negative-electrode active material can further have a relatively high gram capacity, which helps increase the energy density of the battery.

In some implementations, the volume-based particle size distribution $D_v10$ of the first negative-electrode active material is 5 μm-9 μm, for example, may be 6 μm-8 μm. A smaller content of small particles in the first negative-electrode active material can reduce side reactions between the electrolyte and the material, reduce irreversible consumption of active ions, and improve the cycling performance and high-temperature energy storage performance. The first negative-electrode active material with $D_v10$ being within an appropriate range can further improve a proportion of active material per unit volume, thereby improving the energy density of the battery.

In some implementations, a particle size specific surface area of the first negative-electrode active material is 0.45 m²/g-0.65 m²/g, for example, may be 0.5 m²/g-0.63 m²/g, 0.48 m²/g-0.55 m²/g, or 0.52 m²/g-0.6 m²/g.

It should be noted that the "particle size specific surface area" of the negative-electrode active material of this disclosure is not the same as a conventional "specific surface area" of the negative-electrode active material. At present, the specific surface area (SSA) of the negative-electrode active material in the industry is mostly obtained by using a gas adsorption BET method, and is merely used to characterize a physical adsorption specific surface area of the negative-electrode active material. The "particle size specific surface area" of the negative-electrode active material in this disclosure is obtained by using a laser diffraction particle size analysis method, and may be used to characterize a degree by which a morphology of the negative-electrode active material deviates from a sphere.

The inventor(s) has found that the first negative-electrode active material with the particle size specific surface area being within an appropriate range can further improve an ion deintercalation ion channel in the first negative-electrode film layer, and reduce charge exchange resistance, so that the first negative electrode film layer obtains smoother pore channels, improving wettability of the electrolyte. This further improves a solid-phase and liquid-phase transmission speed of active ions in the negative-electrode plate, and further improves the fast charging performance and cycling performance of the battery. The particle size specific surface area of the first negative-electrode active material further improves film-forming efficiency of a SEI (solid electrolyte interface, solid electrolyte interface) film, and can reduce consumption of the electrolyte and further improve the cycling performance of the battery. In addition, the first negative-electrode active material having an appropriate particle size specific surface area can enable the particles of the first negative-electrode film layer to be closely accumulated, thereby helping increase the energy density of the battery.

Figure 5:
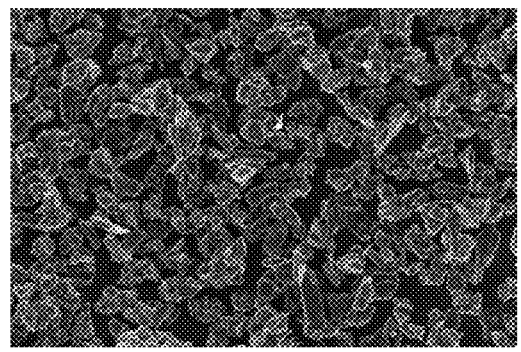
FIG. 5 is a scanning electron microscope (SEM) image of a first negative-electrode active material according to an embodiment of this disclosure.

In some implementations, as shown in FIG. 5, secondary particles may be included in the first negative-electrode active material. Optionally, a number percentage of the secondary particles in the first negative-electrode active material first negative-electrode active material is ≥50%. For example, the quantity proportion of the secondary particles in the first negative-electrode active material is 55%-95%, 60%-100%, 65%-85%, 70%-100%, 75%-90%, 75%-85%, 80%-100%, 80%-90%, 85%-95%, or 90%-100%. When an appropriate proportion of secondary particles is included in the first negative-electrode active material, active-ion deintercalation channels in the first negative-electrode film layer are increased, and an active-ion intercalation path is shortened, further improving the fast-charging capability of the battery, reducing polarization, and reducing side reaction of the electrolyte in the negative electrode. This further enables the battery to have better cycling performance and energy storage performance.

In some implementations, a specific surface area (SSA) of the first negative-electrode active material is 0.8 m²/g-1.3 m²/g, for example, may be 0.85 m²/g-1.15 m²/g, 0.9 m²/g-1.2 m²/g, or 0.95-1.25 m²/g. The first negative-electrode active material with the specific surface area (SSA) being within an appropriate range can improve wettability of the electrolyte in the filer layer, and improve liquid-phase transmission of active ions, and the surface of the material can have higher electrochemical reactivity. The active ions can be transmitted in the solid phase in a timely manner during intercalation. It is also ensured that there are fewer side reactions between the material and the electrolyte, so that the battery obtains a higher fast-charging capability and cycling performance.

In some implementations, a powder 01 value of the first negative-electrode active material is 2.0-4.0, such as 2.2-3.2, 2.3-3.6, 2.5-3.4, or 2.8-3.8. The powder 01 value of the first negative-electrode active material is small, and the particles have active-ion intercalation ports in all directions, so that active ions from the positive electrode can be quickly received, thereby further improving the fast-charging capability. In addition, the isotropic particle structure helps disperse an expansion rate during intercalation of the active ions, and reduces cycling expansion force, thereby further improving the cycling performance.

In some implementations, a tap density of the first negative-electrode active material is 0.85 g/cm$^3$-1.4 g/cm$^3$, for example, may be 0.9 g/cm$^3$-1.2 g/cm$^3$, 0.95 g/cm$^3$-1.15 g/cm$^3$, 1.0 g/cm$^3$-1.25 g/cm$^3$, or 1.05 g/cm$^3$-1.35 g/cm$^3$. The first negative-electrode active material with the tap density being within the given range helps maintain good contact between particles in the first negative-electrode film layer to obtain a better inter-particle spacing structure, ensuring a smooth active ion transmission channel and improving the fast-charging capability of the battery. In addition, the particles are closely accumulated, further improving the energy density of the battery.

In some implementations, a powder compacted density of the first negative-electrode active material under 2 kN pressure is 1.55 g/cm$^3$-1.70 g/cm$^3$; and for example, may be 1.55 g/cm$^3$-1.63 g/cm$^3$, 1.58 g/cm$^3$-1.68 g/cm$^3$, or 1.60 g/cm$^3$-1.68 g/cm$^3$. The first negative-electrode active material with the powder compacted density under the pressure of 2 kN being within the given range make the particles in the first negative-electrode film layer closely accumulated, and increases the content of the active material per unit volume, thereby improving the energy density of the battery.

In some implementations, the gram capacity of the first negative-electrode active material is 345 mAh/g-360 mAh/g, for example, may be 350 mAh/g-358 mAh/g, 351 mAh/g-356 mAh/g, or 352 mAh/g-355 mAh/g. The first negative-electrode active material with a higher gram capacity can increase the energy density of the battery. The gram capacity of the first negative-electrode active material being within the foregoing range means that the active-ion migration path of the material is short. This can improve the fast-charging capability of the battery.

In some implementations, at least part of the surface of the first negative-electrode active material is provided with an amorphous carbon coating layer. Optionally, more than 80% of the surface of the first negative-electrode active material is covered with the amorphous carbon coating layer. Further, 90%-100% of the surface of the first negative-electrode active material is covered with the amorphous carbon coating layer.

The amorphous carbon coating layer may be formed by carbonizing an organic carbon source. For example, the organic carbon source may be selected from high molecular polymers, such as coal pitch, petroleum pitch, phenolic resin, or coconut shell.

The amorphous carbon coating layer can play a protective role of isolating the electrolyte from the first negative-electrode active material, improving structural stability, increasing an active-ion diffusion rate of particles, and further improving the cycling performance and fast-charging capability of the battery.

In some implementations, a mass percentage of the first graphite in the first negative-electrode active material is ≥80%. For example, the mass percentage of the first graphite in the first negative-electrode active material may be 85%-100%, 90%-100%, or 95%-100%. The first negative-electrode film layer includes a relatively large amount of first graphite, and can fully exert the effect of improving active-ion diffusion performance of the negative-electrode plate by the first negative-electrode active material when an intercalation amount of active ions is high, so that the negative-electrode plate at this stage has a high charging speed and charging depth, effectively improving the fast-charging capability of the battery.

In some implementations, in addition to the foregoing first graphite of this disclosure, the first negative-electrode active material in the negative-electrode plate may further optionally include a specific quantity of other commonly used negative-electrode active materials, for example, one or more of natural graphite, silicon-based material, tin-based material, soft carbon, hard carbon, and lithium titanate.

In some implementations, the first negative-electrode active material further includes a silicon-based material. The silicon-based material may include one or more of elemental silicon, silicon oxide (SiOx, 0<x<2), silicon-carbon composite, silicon-nitrogen composite, and silicon alloy material. The silicon-based material can play a role of improving a pore structure in the first negative-electrode film layer, facilitate infiltration and liquid retention of the electrolyte, and also increase the capacity of the-electrode plate, thereby further improving the fast-charging capability and energy density of the battery.

In some implementations, when the first negative-electrode active material further includes a silicon-based material, the mass percentage of the silicon-based material in the first negative-electrode active material is ≤10%. For example, the mass percentage of the silicon-based material in the first negative-electrode active material may be 1%-8%, 2%-6%, or 3%-7%. The first negative-electrode active material including an appropriate amount of silicon-based material can improve the fast-charging capability and energy density of the battery, and enables the battery to further have higher cycling performance and high-temperature energy storage performance.

In the secondary battery of this disclosure, the second negative-electrode film layer includes a second negative-electrode active material. A second graphite is included in the second negative-electrode active material. A material type of the second graphite and the first graphite may be the same or different.

In the secondary battery of this disclosure, the second graphite may be selected from one or more of artificial graphite and natural graphite. The second negative-electrode active material can have higher cycling stability and a higher gram capacity, so that the battery has higher cycling performance and energy density.

In some implementations, the second graphite includes artificial graphite. Optionally, the mass percentage of the artificial graphite in the second graphite is ≥50%. For example, the mass percentage of the artificial graphite in the second graphite may be 60%-100%, 70%-100%, 80%-100%, or 90%-100%. The artificial graphite has better structural stability. The second negative-electrode active material including a relatively large amount of artificial graphite helps maintain a good pore structure in an inner layer (the second negative-electrode film layer) of the negative-electrode film layer, so that the inner layer of the negative-electrode film layer also has high electrolyte wettability and liquid retention rate, further improving an overall ion transmission rate of the negative-electrode plate and improving the fast-charging capability of the battery. In addition, the second negative-electrode active material including a relatively large amount of artificial graphite can further improve its electrolyte compatibility and improve the cycling performance and high-temperature energy storage performance of the battery.

In some implementations, the second graphite includes artificial graphite and natural graphite.

In some implementations, when the second graphite includes both artificial graphite and natural graphite, the mass percentage of the natural graphite in the second negative-electrode active material is ≤40%, for example, being 5%-40%, 10%-40% 30%, or 10%-20%. The second negative-electrode active material including a specific amount of natural graphite can further improve the kinetic performance of the negative-electrode plate, so that the battery can obtain a higher fast-charging capability. The second negative-electrode active material with an appropriate proportion of the artificial graphite and the natural graphite can achieve a balance between the fast charging ability and the cycling performance and high-temperature energy storage performance of the battery.

In some implementations, a distribution of volume-based particle size $D_v99$ of the second negative-electrode active material is greater than the volume-based particle size distribution $D_v99$ of the first negative-electrode active material. The second negative-electrode active material with $D_v99$ being larger helps increase a capacity of the negative electrode, and can reduce side reaction between the electrolyte and the negative-electrode active material, thereby improving the energy density, cycling performance and high-temperature energy storage performance of the battery.

In some implementations, $D_v99$ of the second negative-electrode active material may be 28 μm-55 μm, 30 μm-50 μm, 40 μm-55 μm, 40 μm-50 μm, or 45 μm-50 μm. For example, $D_v99$ of the second negative-electrode active material may be 41.6 μm, 44.5 μm, 45.2 μm, 48.7 μm, 50.1 μm, 52.3 μm, or 54.8 μm.

In some implementations, a ratio of $D_v99$ of the second negative-electrode active material to $D_v99$ of the first negative-electrode active material is 2.0-2.6, for example, may be 2.1-2.45, 2.1-2.4, 2.2-2.6, or 2.2-2.5. With the ratio of $D_v99$ of the second negative-electrode active material to $D_v99$ of the first negative-electrode active material falling within the foregoing range, the energy density, cycling, and high-temperature energy storage performance of the battery can be improved. In addition, the negative electrode has a higher active ion and electron transmission capability, so that the battery further has a higher fast-charging capability. In some implementations, a volume-based median particle size $D_v50$ of the second negative-electrode active material is 15 μm-21 μm, for example, may be 15 μm-18 μm, 16 μm-19 μm, 16 μm-18 μm, 16 μm-17 μm, 16.5 μm-20 μm, 17 μm-20 μm, or 17 μm-21 μm. For example, $D_v50$ may be 15.9 μm, 16.1 μm, 16.5 μm, 16.6 μm, 16.8 μm, 16.9 μm, or 17.5 μm. The second negative-electrode active material with $D_v50$ being within the foregoing range enables the second negative-electrode film layer to have a higher active-ion diffusion capacity, but also reduces side reaction of the electrolyte in the negative electrode, so that the battery has a higher fast-charging capability and cycling performance. In addition, the second negative-electrode active material can further have a relatively high gram capacity, so that the battery obtains a higher energy density of the battery.

In some implementations, the second negative-electrode active material satisfies: $0.9 \leq (D_v90-D_v10)/D_v50 \leq 1.6$. For example, $(D_v90-D_v10)/D_v50$ of the second negative-electrode active material may be 1.0-1.4, 1.05-1.35, or 1.1-1.25. The second negative-electrode active material with $(D_v90-D_v10)/D_v50$ being within the foregoing range can improve accumulation performance of the particles and increase the proportion of active materials, thereby increasing the volumetric energy density of the battery. In particular, an overall particle distribution uniformity of the negative-electrode film layer is relatively good, and an appropriate pore structure is formed between the particles, improving the fast-charging capability of the battery.

In some implementations, a distribution of volume-based particle size $D_v10$ of the second negative-electrode active material is 5 μm-14 μm, for example, may be 6 μm-10 μm, 7 μm-12 μm, or 7 μm-9 μm. The second negative-electrode active material including fewer small particles can reduce side reaction of the electrolyte in the negative electrode and irreversible consumption of the active ions, thereby improving the cycling performance and energy storage performance of the battery.

In some implementations, the volume-based particle size distribution $D_v90$ of the first negative-electrode active material is 24 μm-38 μm, for example, may be 26 μm-33 μm. The second negative-electrode active material including fewer large particles can improve active ion and electron transmission performance of the negative-electrode film layer, reduce polarization, and improve the cycling performance and fast-charging capability of the battery. In addition, the second negative-electrode active material can further have a relatively high gram capacity, further improving the energy density of the battery.

Figure 6:
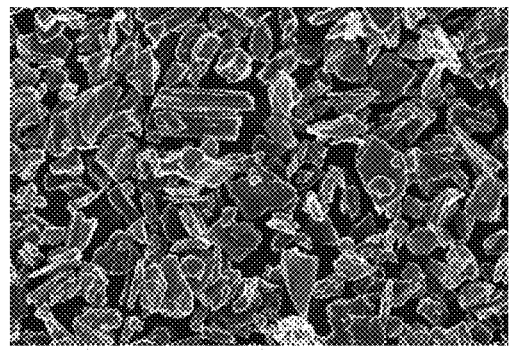
FIG. 6 is a SEM image of a second negative-electrode active material according to an embodiment of this disclosure.

In some implementations, optionally, as shown in FIG. 6, the second graphite includes primary particles, and a number percentage of the primary particles in the second graphite is ≥50%. For example, the quantity proportion of the primary particles in the second graphite may be 55%-95%, 60%-100%, 65%-90%, 65%-80%, 70%-100%, 75%-90%, 80%-100%, 90%-100%, or 95%-100%. The second negative-electrode active material including an appropriate proportion of primary particles can have higher structural stability and reduce side reaction of the electrolyte at the negative electrode, thereby improving the high-temperature energy storage performance and cycling performance of the battery. In addition, use of the second negative-electrode active material can also improve the compacted density of the negative-electrode film layer, thereby improving the energy density of the battery.

In some implementations, a particle size uniformity of the second negative-electrode active material is 0.3-0.55. For example, the particle size uniformity of the second negative-electrode active material is 0.39-0.49, 0.4-0.5, 0.42-0.48, or 0.43-0.46. The second negative-electrode active material with the particle size uniformity being within the foregoing range can further improve the compacted density of the negative-electrode film layer, thereby improving the energy density of the battery. In addition, the second negative-electrode film layer can have good electrolytic-infiltrated pore channels, so that the battery can have higher cycling performance.

In some implementations, a particle size specific surface area of the second negative-electrode active material is 0.35 $m^2$/g-0.55 $m^2$/g, for example, may be 0.36 $m^2$/g-0.48 $m^2$/g, 0.38 $m^2$/g-0.50 $m^2$/g, or 0.42 $m^2$/g-0.53 $m^2$/g. The second negative-electrode active material with the particle size specific surface area being within an appropriate range enables the second negative-electrode film layer to have more ion deintercalation channels and an appropriate pore structure, ensuring a relatively low impedance and further reducing consumption of the electrolyte and active ions. This further improves the cycling performance and energy storage performance of the battery. In addition, the second negative-electrode active material having an appropriate particle size specific surface area can enable the particles of the first negative-electrode film layer to be closely accumulated, thereby helping increase the energy density of the battery.

In some implementations, a specific surface area (SSA) of the second negative-electrode active material is 1.0 $m^2$/g-2.0 $m^2$/g, for example, may be 1.3 $m^2$/g-1.8 $m^2$/g. The second negative-electrode active material with the specific surface area (SSA) being within an appropriate range enables the second negative-electrode film layer to have higher active-ion solid-phase diffusion performance, and also ensures less side reaction between the material and the electrolyte. This helps the battery to obtain a higher fast-charging capability, cycling performance, and energy storage performance.

In some implementations, a powder OI value of the second negative-electrode active material is ≤14, optionally, 5-14, 6-11, or 7-10. The second negative-electrode active material not only has relatively good active-ion intercalation performance, but also enables the negative-electrode film layer to have lower cycle expansion, so that the battery has a higher fast-charging capability, cycling performance, and energy density.

In some implementations, a gram capacity of the second negative-electrode active material is 353 mAh/g-370 mAh/g, for example, may be 359 mAh/g-367 mAh/g or 360 mAh/g-365 mAh/g. The second negative-electrode active material with a higher gram capacity can increase the energy density of the battery. The gram capacity of the first negative-electrode active material being within the foregoing range means that the material has better cycling stability, thereby improving the cycling performance of the battery.

In some implementations, a tap density of the second negative-electrode active material is 0.8 g/cm$^3$-1.2 g/cm$^3$, for example, may be 0.9 g/cm$^3$-1.1 g/cm$^3$ or 0.95 g/cm$^3$-1.08 g/cm$^3$. The second negative-electrode active material with the tap density being within the given range makes particles of the second negative-electrode film layer come in close contact, and maintains an excellent pore structure between active particles, thereby improving the fast-charging capability and the energy density of the battery.

In some implementations, a powder compacted density of the second negative-electrode active material under 2 kN pressure is 1.70 g/cm$^3$-1.85 g/cm$^3$; and for example, may be 1.75 g/cm$^3$-1.82 g/cm$^3$. The second negative-electrode active material with the powder compacted density under the pressure of 2 kN being within an appropriate range can improve the compacted density of the negative-electrode film layer, thereby improving the energy density of the battery.

In the secondary battery of this disclosure, in addition to the foregoing second graphite of this disclosure, the second negative-electrode active material further optionally includes a specific quantity of other commonly used negative-electrode active materials, for example, one or more of silicon-based material, tin-based material, soft carbon, hard carbon, and lithium titanate.

The negative-electrode film layer of this disclosure is usually obtained through drying after a negative-electrode slurry is applied. The negative-electrode slurry is usually obtained by dispersing the negative-electrode active material and optionally a conductive agent, a binder, or the like in a solvent and stirring uniformly. The solvent may be N-methylpyrrolidone (NMP) or deionized water.

In the secondary battery of this disclosure, the first negative-electrode film layer or the second negative-electrode film layer usually includes the negative-electrode active material and optionally a binder, optionally a conductive agent, and other optional auxiliary agents. A person skilled in the art may make selection according to actual requirements. As an example, the conductive agent is one or more of superconducting carbon, carbon black (for example, acetylene black or Ketjen black), carbon dots, carbon nanotube, graphene, and carbon nanofiber. The binder may include one or more of styrene-butadiene rubber (SBR), water-soluble unsaturated resin SR-1B, water-based acrylic resin, polyvinyl alcohol (PVA), sodium alginate (SA), and carboxymethyl chitosan (CMCS). Other optional auxiliary agents are, for example, a thickener (for example, sodium carboxymethyl cellulose CMC-Na) or a PTC thermistor material.

In some implementations, an areal density of the negative-electrode film layer is 0.117 mg/mm$^2$-0.130 mg/mm$^2$, for example, may be 0.117 mg/mm$^2$-0.125 mg/mm$^2$ 0.118 mg/mm$^2$-0.122 mg/mm$^2$, 0.120 mg/mm$^2$-0.127 mg/mm$^2$, or 0.121 mg/mm$^2$-0.125 mg/mm$^2$. It should be noted that the areal density of the negative-electrode film layer is an areal density of the entire negative-electrode film layer (for example, a sum of the areal density of the first negative-electrode film layer and that of the second negative-electrode film layer). The negative-electrode film layer with the areal density being within the foregoing range can enable the negative-electrode plate to have a higher capacity, and reduce a migration distance and impedance of active ions and electrons in the film layer, thereby further improving the energy density and fast-charging capability of the battery.

In some implementations, the compacted density of the negative-electrode film layer is 1.65 g/cm$^3$-1.75 g/cm$^3$, for example, may be 1.65 g/cm$^3$-1.68 g/cm$^3$, 1.66 g/cm$^3$-1.70 g/cm$^3$, or 1.68 g/cm$^3$-1.72 g/cm$^3$. It should be noted that the compacted density of the negative-electrode film layer is a compacted density of the entire negative-electrode film layer (that is, a ratio of the areal density to the thickness of the negative-electrode film layer). The negative-electrode film layer with the compacted density being within the given range can enable the negative-electrode plate to have a relatively high reversible capacity and also have a good low cycling expansion performance and kinetic performance, thereby further improving the energy density, fast-charging capability, and cycling performance of the battery.

In some implementations, a thickness ratio of the second negative-electrode film layer to the first negative-electrode film layer is 0.7:1-2.3:1. The thickness ratio of the second negative-electrode film layer to the first negative-electrode film layer being within an appropriate range can further improve the fast-charging capability or energy density of the battery. In order to obtain a higher fast-charging capability, optionally, the thickness ratio of the second negative-electrode film layer to the first negative-electrode film layer may be 0.7:1-1.0:1, 0.75:1-0.9:1, or 0.8:1-1.0:1. In order to obtain a higher energy density, optionally, the thickness ratio of the second negative-electrode film layer to the first negative-electrode film layer may be 1.1:1-2.3:1, 1.3-2.1:1, or 1.5-2:1.

In some implementations, a total thickness of the negative-electrode film layer is optionally 60 μm-90 μm, for example, may be 65 μm-80 μm. A total thickness of the negative-electrode film layer is a sum of the thicknesses of the first negative-electrode film layer and that of the second negative-electrode film layer.

In the secondary battery of this disclosure, the negative-electrode current collector may use a metal foil or a composite current collector (a metal material may be provided on a polymer matrix to form the composite current collector). As an example, the negative-electrode current collector may use a copper foil.

In the secondary battery of this disclosure, the negative-electrode film layer may be provided on one side of the negative-electrode current collector, or may be provided on both sides of the negative-electrode current collector. For example, the negative-electrode current collector has opposite sides in its own thickness direction, and the negative-electrode film layer is provided on any one or both sides of the opposite sides of the negative-electrode current collector.

Figure 3:
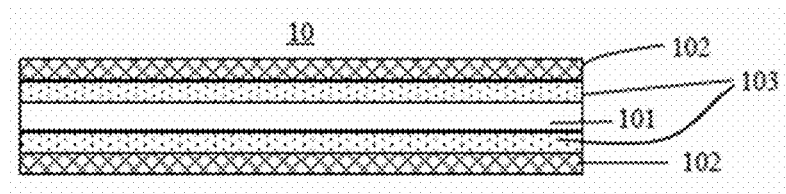
FIG. 3 is a schematic diagram of a negative-electrode plate of a secondary battery according to an embodiment of this disclosure.

FIG. 3 is a schematic diagram of a negative-electrode plate 10 according to an implementation of this disclosure. The negative-electrode plate 10 is formed by a negative-electrode current collector 101, a second negative-electrode film layer 103 disposed on both sides of the negative-electrode current collector 101, and a first negative-electrode film layer 102 disposed on the second negative-electrode film layer 103.

Figure 4:
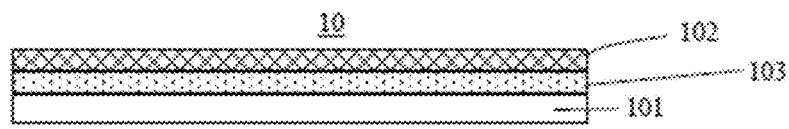
FIG. 4 is a schematic diagram of a negative-electrode plate of a secondary battery according to another embodiment of this disclosure.

FIG. 4 is a schematic diagram of a negative-electrode plate 10 according to another implementation of this disclosure. The negative-electrode plate 10 is formed by a negative-electrode current collector 101, a second negative-electrode film layer 103 disposed on one side of the negative-electrode current collector, and a first negative-electrode film layer 102 disposed on the second negative-electrode film layer 103.

It should be noted that the parameters of the negative-electrode film layers (for example, film thickness, compacted density, and areal density) given in this disclosure all refer to a parameter range of a one-sided film layer. When the negative-electrode film layer is disposed on both sides of the negative-electrode current collector, parameters of the film layer on any one side satisfy this disclosure, that is, being considered to fall within the protection scope of this disclosure. Ranges such as the film thickness, compacted density, and areal density described in this disclosure all refer to the parameters that are of the film layer compacted by cold pressing and that are used for assembling the battery.

In addition, in the secondary battery of this disclosure, the negative-electrode plate does not exclude additional functional layers other than the negative-electrode film layer. For example, in some implementations, the negative-electrode plate described in this disclosure may further include a conductive primer layer (which is, for example, formed by a conductive agent and a binder) disposed between the negative-electrode current collector and the second negative-electrode film layer. In some other implementations, the negative-electrode plate of this disclosure further includes a protective layer covering a surface of the first negative-electrode film layer.

In this disclosure, $D_v99$, $D_v90$, $D_v50$, $D_v10$, the particle size uniformity (Uniformity), and the particle size specific surface area of the negative-electrode active material can be measured by using the laser diffraction particle size analysis method. For example, referring to the standard GB/T 19077.1-2016, a laser particle size analyzer (for example, Malvern Master Size 3000) is used for testing.

$D_v99$ is a particle size corresponding to a cumulative volume distribution percentage of the negative-electrode active material reaching 99%; $D_v90$ is a particle size corresponding to a cumulative volume distribution percentage of the negative-electrode active material reaching 90%; $D_v50$ is a particle size corresponding to a cumulative volume distribution percentage of the negative-electrode active material reaching 50%; and $D_v10$ is a particle size corresponding to a cumulative volume distribution percentage of the negative-electrode active material reaching 10%.

In this disclosure, the primary particle and secondary particle have meanings known in the art. The primary particle is a non-agglomerated particle, and the secondary particle is an agglomerated particle formed through aggregation of two or more primary particles. The primary particles and secondary particles can be easily distinguished with SEM images photographed by using a scanning electron microscope.

a number percentage of the primary particles or secondary particles in the negative-electrode active material can be measured by using an instrument and method known in the art, for example, by using a scanning electron microscopy. An exemplary testing method for the quantity proportion of the secondary particles includes: placing and attaching the negative-electrode active material on a conductive adhesive to make a to-be-tested sample with a length of 6 cm and a width of 1.1 cm; and using a scanning electron microscope (for example, ZEISS Sigma 300) to analyze the morphology of the particles. For testing, reference may be made to JY/T010-1996. In order to ensure accuracy of test results, a plurality (for example, 5) of different regions of the to-be-tested sample may be randomly selected for scanning and testing, and a number percentage of the secondary particles in each region in the total number of particles is obtained through calculation at a magnification (for example, 1000 times). An average value of test results of the plurality of test regions is used as the test result. In order to ensure accuracy of the test results, a plurality (for example, 10) of test samples can be fetched to repeat the foregoing test, and an average value for all the test samples is used as a final test result. Similarly, the quantity proportion of the primary particles in the second negative-electrode active material can also be tested.

In accordance with this disclosure, the powder OI value of the negative-electrode active material has a meaning known in the art, and can be tested by using a method known in the art. For example, an X-ray powder diffractometer (for example, Bruker D8 Discover) can be used to obtain an X-ray diffraction pattern of the negative-electrode active material according to JIS K 0131-1996 and JB/T4220-2011; then the powder OI value of the negative-electrode active material can be obtained through calculation according to the OI value=$C_{004}/C_{110}$. $C_{004}$ is a peak area of a characteristic diffraction peak of a 004 crystal plane of graphite, and $C_{110}$ is a peak area of a characteristic diffraction peak of a 110 crystal plane of the graphite.

In the X-ray diffraction analysis test of this disclosure, a copper target can be used as an anode target, CuKα ray is used as a radiation source, a ray wavelength λ is 1.5418 Å, a scanning 2θ angle range is 20°-80°, and a scanning rate may be 4°/min.

In accordance with this disclosure, the tap density of the negative-electrode active material has a meaning known in the art, and can be tested by using a method known in the art. For example, testing may be performed by referring to the standard GB/T 5162-2006, and using a powder tap density tester. If Dandong Baxter BT-301 is used, test parameters are as follows: vibration frequency: 250±15 times/min, amplitude: 3±0.2 mm, vibration frequency: 5000 times, measuring cylinder: 25 mL.

In accordance with this disclosure, the powder compacted density of the negative-electrode active material under a pressure of 2 kN has a meaning known in the art, and can be tested by using a method known in the art. For example, reference is made to the standard GB/T 24533-2009, and an electronic pressure testing machine (for example, UTM7305) is used for testing. An example test method is as follows: weighing and adding 1 g of the negative-electrode active material to a mold with a bottom area of 1.327 cm², applying pressure to 200 kg (equivalent to 2 kN) and holding the pressure for 30 s, releasing the pressure and waiting for 10 s, and then recording and calculating the powder compacted density of the negative-electrode active material under the 2 kN pressure.

In accordance with this disclosure, the specific surface area (SSA) of the negative-electrode active material has a meaning known in the art, and can be tested by using a method known in the art. For example, testing is performed by referring to GB/T 19587-2017 and using a nitrogen adsorption specific surface area analysis test method, so as to perform calculation according to a BET (Brunauer Emmett Teller) method. Nitrogen adsorption specific surface area testing may be performed by using a Tri-SEAR 3020 specific surface area tester of Micromeritics company in the United States.

The gram capacity of the negative-electrode active material has a meaning known in the art, and can be tested by using a method known in the art. An example test method is as follows: mixing the prepared negative-electrode active material, a conductive agent carbon black (Super P), and a binder polyvinylidene fluoride (PVDF) at a mass ratio of 91.6:1.8:6.6 evenly in a solvent N-methylpyrrolidone (NMP) to obtain a slurry, applying the prepared slurry on a copper foil current collector, and drying it in an oven for later use. A metal lithium sheet is used as a counter electrode, and a polyethylene (PE) film is used as the separator. Ethylene carbonate (EC), ethyl methyl carbonate (EMC), and diethyl carbonate (DEC) are mixed at a volume ratio of 1:1:1, and then $LiPF_6$ was uniformly dissolved in the foregoing solution to obtain an electrolyte, where the concentration of $LiPF_6$ is 1 mol/L. A CR2430 coin battery is assembled in an argon gas-protected glove box. After being left standing for 12 hours, the obtained coin battery is discharged to 0.005V at a constant current of 0.05C at 25° C. and left standing for 10 minutes; discharged to 0.005V at a constant current of 50 μA, left standing for 10 minutes, and discharged to 0.005V at a constant current of 10 μA; and then charged to 2V at a constant current of 0.1C. A charging capacity is recorded. A ratio of the charging capacity to the mass of the negative-electrode active material is the gram capacity of the prepared negative-electrode active material.

In accordance with this disclosure, the thickness of the negative-electrode film layer has a meaning known in the art, and can be tested by using a method known in the art, such as a micrometer (for example, Mitutoyo 293-100 model, with an accuracy of 0.1 μm).

In accordance with this disclosure, the thicknesses of the first negative-electrode film layer and that of the second negative-electrode film layer can be separately tested by using a scanning electron microscope (for example, ZEISS Sigma 300). Sample preparation is as follows: first cutting a negative-electrode plate into a to-be-tested sample of a specific size (for example, 2 cm×2 cm), and fastening the negative-electrode plate to a sample stage by using paraffin; placing the sample stage in a sample holder and locking the sample holder firmly, turning on an argon ion cross-section polisher (for example, IB-19500CP) and performing evacuation (for example, 10-4 Pa), setting argon flow (for example, 0.15 MPa), voltage (for example, 8 KV), and polishing time (for example, 2 hours), and then adjusting the sample stage to rocking mode to start polishing. For sample testing, reference may be made to JY/T010-1996. In order to ensure accuracy of the test results, a plurality (for example, 5) of different regions of the to-be-tested sample may be randomly selected for scanning and testing, and the thickness of the first negative film layer and that of the second negative film layer in the test regions are read a magnification (for example, 500 times). An average value of test results of the plurality of test regions is used as the test result.

In accordance with this disclosure, the areal density of the negative-electrode active material has a meaning known in the art, and can be tested by using a method known in the art. For example, a single-side coated and cold-pressed negative-electrode plate (if a double-side coated negative-electrode plate is used, the negative-electrode film layer on one side is wiped off first) is fetched, and punched into small circles with an area of S1, whose weight is weighed and recorded as M1. The negative-electrode film layer of the negative-electrode plate after weighing is wiped off, and the weight of the negative-electrode current collector is weighed and recorded as M0. The areal density of the negative-electrode film layer=(weight of the negative-electrode plate M1−weight of the negative-electrode current collector M0)/ S1.

In accordance with this disclosure, the compacted density of the negative-electrode active material has a meaning known in the art, and can be tested by using a method known in the art. The compacted density of the negative-electrode film layer=area density of the negative-electrode film layer/ thickness of the negative-electrode film layer.

It should be noted that for testing of the foregoing parameters for the negative-electrode film layer or negative-electrode active material, samples can be fetched during battery preparation, or may be fetched from a prepared secondary battery.

In a case that the foregoing testing samples are fetched from the prepared secondary battery, as an example, a sample may be obtained by performing the following steps:
(1) Discharging the secondary battery (for sake of safety, generally making the battery in fully discharged state), disassembling the battery, and taking out the negative-electrode plate, using dimethyl carbonate (DMC) to soak the negative-electrode plate for a specific time (for example, 2-10 hours); and then taking out the negative-electrode plate and drying it at a given temperature for a specific time (for example, 60° C., 4 h), and taking out the negative-electrode plate obtained after drying. In this case, the samples may be fetched from a dried negative-electrode plate to test parameters related to the negative-electrode film layer described above in this disclosure.
(2) Baking, at a given temperature for a specific time (for example, 400° C., 2 h), the negative-electrode plate obtained after drying in step (1), randomly selecting a region from the negative-electrode plate obtained after baking, and obtaining a negative-electrode active material sample (the sample may be obtained by scraping powder using a blade), where a depth of powder scraping does not exceed a demarcation region between the first negative-electrode film layer and the second negative-electrode film layer; and then sampling the second negative-electrode active material in the same manner.

Because in the negative-electrode film layer preparation process, the demarcation region between the first negative-electrode film layer and the second negative-electrode film layer may have a fusion layer (that is, the first negative-electrode active material and the second negative-electrode active material simultaneously exist in the fusion layer). For accuracy of the test, during sampling of the second negative-electrode active material, the fusion layer may be scraped off first, and then powder scraping is performed on the second negative-electrode active material for sampling.
(3) Separately sieving the first negative-electrode active material and the second negative-electrode active material that are collected in step (2) (for example sieving with a 200-mesh screen), to finally obtain samples of the first negative-electrode active material and the second negative-electrode active material that can be used for testing the foregoing material parameters of this disclosure.

In the foregoing sampling process, an optical microscope or a scanning electron microscope can be used to assist in determining a position of the demarcation region between the first negative-electrode film layer and the second negative-electrode film layer.

[Positive-Electrode Plate]

In the secondary battery of this disclosure, the positive-electrode plate includes a positive-electrode current collector and a positive-electrode film layer that is provided on at least one surface of the positive-electrode current collector and that includes a positive-electrode active material. For example, the positive-electrode current collector has two surfaces opposite in its thickness direction, and the positive-electrode film layer is provided on either or both of the two opposite surfaces of the positive-electrode current collector.

In the secondary battery of this disclosure, a positive-electrode active material for the secondary battery known in the art can be used as the positive-electrode active material. For example, the positive-electrode active material may include one or more of lithium transition metal oxide, olivine-structured lithium-containing phosphate, and respective modified compounds thereof. Examples of the lithium transition metal oxide may include, but are not limited to, one or more of lithium cobalt oxide, lithium nickel oxide, lithium manganese oxide, lithium nickel cobalt oxide, lithium manganese cobalt oxide, lithium nickel manganese oxide, lithium nickel cobalt manganese oxide, lithium nickel cobalt aluminum oxide, and modified compounds thereof. Examples of the olivine-structured lithium-containing phosphate may include, but are not limited to, one or more of lithium iron phosphate, lithium iron phosphate-carbon composite, lithium manganese phosphate, lithium manganese phosphate-carbon composite, lithium iron manganese phosphate, lithium iron manganese phosphate-carbon composite, and respective modified compounds thereof. This disclosure is not limited to these materials, and other conventionally known materials that can be used as positive-electrode active materials for secondary batteries can also be used.

In some optional implementations, in order to further increase the energy density of the battery, the positive-electrode active material may include one or more of the lithium transition metal oxides shown in Formula 1 and modified compounds thereof.

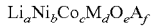   Formula 1

In Formula 1, 0.8≤a≤1.2, 0.5≤b<1, 0<c<1, 0<d<1, 1≤e≤2, or 0≤f≤1, where M is selected from one or more of Mn, Al, Zr, Zn, Cu, Cr, Mg, Fe, V, Ti, and B; and A is selected from one or more of N, F, S, and Cl.

In this disclosure, the modified compounds of the foregoing materials may be modified by doping or surface coating on the positive-electrode active material.

In the secondary battery of this disclosure, the positive-electrode film layer usually includes the positive-electrode active material and optionally a binder, optionally a conductive agent, and is usually obtained through drying and cold pressing after a positive-electrode slurry is applied. The positive-electrode slurry is usually obtained by dispersing the positive-electrode active material and optionally a conductive agent, a binder, or the like in a solvent and stirring uniformly. The solvent may be N-methylpyrrolidone (NMP).

As an example, the binder for the positive-electrode film layer may include one or more of polyvinylidene fluoride (PVDF) and polytetrafluoroethylene (PTFE).

As an example, the conductive agent for the positive-electrode film layer may include one or more of superconducting carbon, carbon black (for example, acetylene black or Ketjen black), carbon dots, carbon nanotube, graphene, and carbon nanofiber.

In the secondary battery of this disclosure, the positive-electrode current collector may use a metal foil or a composite current collector (a metal material may be provided on a polymer matrix to form the composite current collector). As an example, the positive-electrode current collector may use an aluminum foil.

[Electrolyte]

The secondary battery of this disclosure has no specific limitation on a type of the electrolyte, which can be selected as required. For example, the electrolyte may be selected from at least one of solid electrolyte and liquid electrolyte (that is, electrolyte).

In some implementations, the electrolyte uses a liquid electrolyte. The electrolyte includes an electrolytic salt and a solvent.

In some implementations, the electrolytic salt may be selected from one or more of LiPF$_6$ (lithium hexafluorophosphate), LiBF$_4$ (lithium tetrafluoroborate), LiClO$_4$ (lithium perchlorate), LiAsF$_6$ (lithium hexafluoroborate), LiFSI (lithium bisfluorosulfonyl imide), LiTFSI (lithium bis-trifluoromethanesulfon imide), LiTFS (lithium trifluoromethanesulfonat), LiDFOB (lithium difluorooxalatoborate), LiBOB (lithium bisoxalatoborate), LiPO$_2$F$_2$ (lithium difluorophosphate), LiDFOP (lithium difluorophosphate), and LiTFOP (lithium tetrafluoro oxalate phosphate).

In some implementations, the solvent may be selected from one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), methyl sulfonyl methane (MSM), methyl ethyl sulfone (EMS), and diethyl sulfone (ESE).

In some implementations, the electrolyte further optionally includes an additive. For example, the additive may include a negative-electrode film forming additive, or may include a positive-electrode film forming additive, or may include an additive capable of improving some performance of a battery, for example, an additive for improving overcharge performance of the battery, an additive for improving high-temperature performance of the battery, and an additive for improving low-temperature performance of the battery.

[Separator]

In secondary batteries using the liquid electrolyte and some secondary batteries using the solid electrolyte, separators are also included. The separator is provided between the positive-electrode plate and the negative-electrode plate, and plays a role of isolation. There is no particular limitation on the type of the separator in this disclosure, and any known porous-structure separator with good chemical stability and mechanical stability can be selected. In some implementations, a material of the separator may be selected from one or more of glass fiber, non-woven fabric, polyethylene, polypropylene, and polyvinylidene fluoride. The separator may be a single-layer thin film or a multi-layer composite film. When the separator is a multi-layer composite film, each layer may be made of the same or different materials.

In some implementations, the positive-electrode plate, the negative electrode plate, and the separator may be made into an electrode assembly through wounding or lamination.

In some implementations, the secondary battery may include an outer package. The outer package may be used to encapsulate the foregoing electrode assembly and electrolyte.

In some implementations, the outer package of the secondary battery may be a hard shell, for example, a hard plastic shell, an aluminum shell, or a steel shell. The outer package of the secondary battery may alternatively be a soft pack, for example, a soft pouch. A material of the soft pack may be plastic, for example, one or more of polypropylene (PP), polybutylene terephthalate (PBT), polybutylene succinate (PBS), and the like.

This disclosure does not impose any special limitations on a shape of the secondary battery, and the lithium-ion battery may be of a cylindrical shape, a rectangular shape, or any other shapes. FIG. 1 shows a secondary battery 5 with a rectangular structure in an example.

Figure 2:
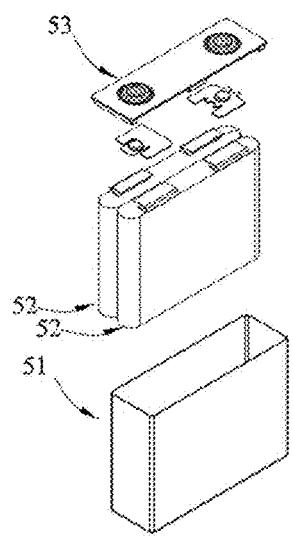
FIG. 2 is a schematic exploded view of a secondary battery according to an embodiment of this disclosure.

In some implementations, referring to FIG. 2, the outer package may include a housing 51 and a cover plate 53. The housing 51 may include a base plate and side plates connected to the base plate, and the base plate and the side plates enclose an accommodating cavity. The housing 51 has an opening communicating with the accommodating cavity, and the cover plate 53 covers the opening to close the accommodating cavity. A positive-electrode plate, a negative-electrode plate, and a separator may be wound or stacked to form an electrode assembly 52. The electrode assembly 52 is encapsulated into the accommodating cavity. The electrolyte is infiltrated into the electrode assembly 52. There may be one or more electrode assemblies 52 in the secondary battery 5, and the quantity may be adjusted as required.

In some implementations, the secondary batteries may be assembled into a battery module. The battery module may include a plurality of secondary batteries, and a specific quantity may be adjusted based on disclosure and capacity of the battery module.

Figure 7:
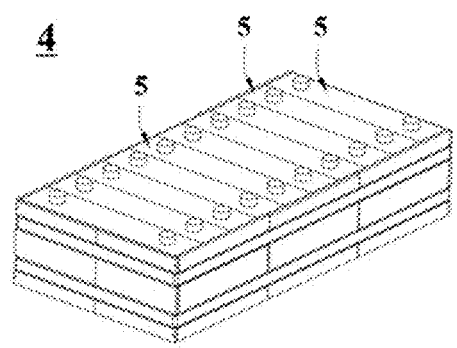
FIG. 7 is a schematic diagram of a battery module according to an embodiment of this disclosure.

FIG. 7 shows a battery module 4 in an example. Referring to FIG. 7, in the battery module 4, a plurality of secondary batteries 5 may be sequentially arranged in a length direction of the battery module 4. Certainly, an arrangement may be made in any other manner. Further, the plurality of secondary batteries 5 may be fastened through fasteners.

Optionally, the battery module 4 may further include a housing with an accommodating space, and the plurality of secondary batteries 5 are accommodated in the accommodating space.

In some implementations, the battery module may be further assembled into a battery pack, and a quantity of battery modules included in the battery pack may be adjusted based on disclosure and capacity of the battery pack.

Figure 8:
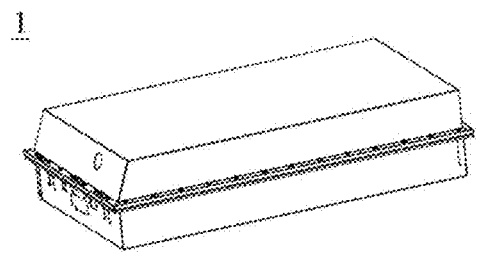
FIG. 8 is a schematic diagram of a battery pack according to an embodiment of this disclosure.
Figure 9:
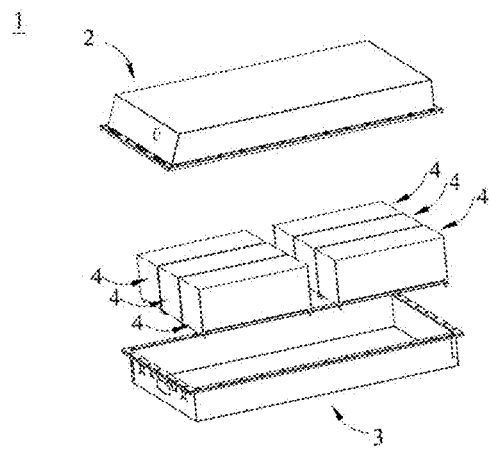
FIG. 9 is an exploded view of FIG. 8.

FIG. 8 and FIG. 9 show a battery pack 1 in an example. Referring to FIG. 8 and FIG. 9, the battery pack 1 may include a battery box and a plurality of battery modules 4 arranged in the battery box. The battery box includes an upper box body 2 and a lower box body 3. The upper box body 2 is configured to cover the lower box body 3 to form a closed space for accommodating the battery modules 4. The plurality of battery modules 4 may be arranged in the battery box in any manner.

Preparation Method

An implementation of a second aspect of this disclosure provides a preparation method of a secondary battery, including at least the following steps for preparing the negative-electrode film layer of the secondary battery: forming a second negative-electrode film layer on at least one side of a negative-electrode current collector, where the second negative-electrode film layer includes a second negative-electrode active material; and forming a first negative-electrode film layer on a surface of the second negative-electrode film layer, where the first negative-electrode film layer includes a first negative-electrode active material, the first negative-electrode active material includes a first graphite, the first graphite is artificial graphite, and a distribution of volume-based particle size $D_v99$ of the first negative-electrode active material is ≤23 µm.

In the preparation method of the secondary battery of this disclosure, the first negative-electrode active material, optionally a conductive agent, optionally a binder, and other optional auxiliary agents may be dispersed in a solvent (for example, deionized water) to form a first negative-electrode active material slurry. The second negative-electrode active material, optionally a conductive agent, optionally a binder, and other optional auxiliary agents may be dispersed in a solvent (for example, deionized water) to form a second negative-electrode active material slurry.

In the preparation method of the secondary battery of this disclosure, the first negative-electrode active material slurry and the second negative-electrode active material slurry may be applied simultaneously at one time, or may be applied separately for two times.

In some implementations, the first negative-electrode active material slurry and the second negative-electrode active material slurry are applied simultaneously at one time. Applying simultaneously at one time may lead to better adhesion between the first negative-electrode film layer and the second negative-electrode film layer, and helps reduce interface resistance of the film layer, and further improve the fast charging ability and cycling performance of the battery.

The second negative-electrode active material used in this disclosure is obtained commercially or prepared by using a method known in the art. A person skilled in the art may make proper selection according to actual use environment.

In the first negative-electrode active material used in this disclosure, the first graphite may be prepared by using a method developed by the inventor(s). In some embodiments, the preparation method of the first graphite includes the following steps (a) to (e).

(a) Provide a petroleum coke raw material, where $D_v99$ of the petroleum coke raw material is 15 µm-21 µm. Optionally, $D_v99$ of the petroleum coke raw material is 16 µm-21 µm, 17 µm-21 µm, 17 µm-20 µm, or 17 µm-19 µm.

(b) Perform shaping and classification on the petroleum coke raw material to obtain a precursor, where $D_v99$ of the precursor is 16 µm-22 µm. Optionally, $D_v99$ of the precursor is 17 µm-22 µm, 17.5 µm-20 µm, 18 µm-21 µm, or 18 µm-20 µm.

(c) Granulate the precursor to obtain a granulated product, where $D_v99$ of the granulated product is 17 µm-24 µm. Optionally, $D_v99$ of the granulated product is 18 µm-24 µm, 19 µm-22 µm, or 19 µm-21 µm.

(d) Perform graphitization treatment on the granulated product at a temperature of 2800° C.-3200° C., followed by sieving, to obtain artificial graphite, where $D_v99$ of the artificial graphite is 17 µm-26 µm. Optionally, $D_v99$ of the artificial graphite is 18 µm-24 µm, 19 µm-26 µm, 21 µm-26 µm, 20 µm-25 µm, 20 µm-23 µm, or 19.5 µm-22 µm.

(e) Coating the artificial graphite by using an organic carbon source, followed by heating treatment, to form an amorphous carbon coating layer on at least part of a surface of the artificial graphite, and then sieving is performed to obtain the first graphite, where $D_v99$ of the first graphite is ≤23 m.

In some implementations, the petroleum coke raw material in step (a) includes one or more of petroleum-based non-needle coke and petroleum-based needle coke. As an example, the petroleum coke raw material is selected from one or more of petroleum calcined coke, needle petroleum green coke, and non-needle petroleum green coke. For example, the petroleum coke raw material includes non-needle petroleum green coke.

In some implementations, $D_v50$ of the petroleum coke raw material in step (a) is 5.5 µm-11 µm; for example, 6 µm-11 µm, 7 µm-10 µm, 6.5 µm-8 µm, 7 µm-8.5 µm, or 8 µm-11 µm. The petroleum coke raw material with $D_v50$ being within an appropriate range helps control $D_v50$ of the first graphite within a required range.

In some implementations, a volatile content $C_1$ of the petroleum coke raw material in step (a) may be 1%-12%, for example, being 3%-10%, 5%-9%, 6%-8%, 7%-8.5%, or 7.5%-8.5%. This can improve particle size distribution of the first graphite. The volatile content of the petroleum coke raw material can be tested by using a method known in the art. For example, testing is performed in accordance with SH/T 0026-1990.

In some implementations, $D_v50$ of the precursor in step (b) is 7 µm-12 µm; for example, being 7.5 µm-11 µm or 8 µm-10 µm.

In some implementations, a particle size uniformity (uniformity) $U_1$ of the precursor in step (b) satisfies $0.2 \leq U_1 \leq 0.55$; for example, $0.2 \leq U_1 \leq 0.5$, $0.25 \leq U_1 \leq 0.45$, $0.3 \leq U_1 \leq 0.45$, $0.3 \leq U_1 \leq 0.4$, $0.35 \leq U_1 \leq 0.55$, or $0.35 \leq U_1 \leq 0.45$. This can improve the particle size uniformity of the first graphite.

In some implementations, $D_v50$ of the granulated product in step (c) is 8 µm-14 µm; for example, being 10 µm-14 µm or 11 µm-13 µm.

In some implementations, in step (c), the precursor and the binder can be mixed, and then high temperature granulation is performed. The binder may be pitch. Granulation may be performed in step (c) by using a device known in the art, for example, a granulator. Optionally, a mixing temperature may be controlled to be 20° C. to 40° C., a mixing frequency to be 35 Hz-38 Hz, and a mixing time to be 50 min to 65 min. The temperature is increased to 300° C.-400° C. at 6-10° C./min and maintained at the temperature for 1 h-2 h; increased to 500° C.-600° C. at 6-10° C./min and maintained at the temperature for 1 h-2 h; increased to 700° C.-800° C. at 6-10° C./min and maintained at the temperature for 1 h-2 h; and then is naturally cooled, so as to obtain a granulated product.

In some implementations, in step (c), an amount $C_2$ of the binder that is added during granulation and the volatile content $C_1$ of the petroleum coke raw material satisfy: $8\% \leq C_1 + C_2 \leq 17\%$. In this way, the granulation degree can be improved, so that the quantity proportion of the secondary particles of the first graphite can satisfy requirements. For example, $8\% \leq C_1 + C_2 \leq 15\%$, $9\% \leq C_1 + C_2 \leq 14\%$, or $10\% \leq C_1 + C_2 \leq 13\%$. The amount $C_2$ of the binder added during granulation is a percentage of the weight of the binder added during granulation in the total weight of the precursor.

In some implementations, in step (c), the amount $C_2$ of the binder that is added during granulation, the volatile content $C_1$ of the petroleum coke raw material, and the particle size uniformity $U_1$ of the precursor satisfy: $21\% \leq (C_1 + C_2)/U_1 \times 100\% \leq 50\%$. This can further improve the granulation degree. For example, $25\% \leq (C_1 + C_2)/U_1 \times 100\% \leq 45\%$, $25\% \leq (C_1 + C_2)/U_1 \times 100\% \leq 38\%$, $27\% \leq (C_1 + C_2)/U_1 \times 100\% \leq 38\%$, $30\% \leq (C_1 + C_2)/U_1 \times 100\% \leq 40\%$, or $31\% \leq (C_1 + C_2)/U_1 \times 100\% \leq 35\%$.

In some implementations, $0\% \leq C_2 \leq 16\%$, for example, $1\% \leq C_2 \leq 12\%$, $2\% \leq C_2 \leq 10\%$, $4\% \leq C_2 \leq 7\%$, or $5\% \leq C_2 \leq 9\%$.

In some implementations, in order to improve the particle size uniformity of the first graphite, the particle size uniformity $U_2$ of the artificial graphite obtained in step (d) may satisfy $0.22 \leq U_2 \leq 0.48$. Optionally, $0.25 \leq U_2 \leq 0.45$, $0.26 \leq U_2 \leq 0.43$, $0.3 \leq U_2 \leq 0.4$, or $0.33 \leq U_2 \leq 0.38$.

In some implementations, in step (e), the organic carbon source may be selected from one or more of pitch (for example, coal pitch or petroleum pitch), phenolic resin, coconut shell, and the like.

In some implementations, in step (e), a temperature of heating treatment may be 700° C.-1800° C., for example, 1000° C.-1300° C.

In some implementations, in step (e), an amount $C_3$ of the organic carbon source that is added in the coating process, a volatile content $C_1$ of the petroleum coke raw material, and an amount $C_2$ of the binder added during granulation satisfy $10\% \leq C_1 + C_2 + C_3 \leq 25\%$; for example, $11\% \leq C_1 + C_2 + C_3 \leq 20\%$, $12\% \leq C_1 + C_2 + C_3 \leq 18\%$, or $13\% \leq C_1 + C_2 + C_3 \leq 16\%$. With the amount $C_3$ of the organic carbon source that is added in the coating process, the volatile content $C_1$ of the petroleum coke raw material, and the amount $C_2$ of the binder added during granulation satisfying the foregoing relationship can improve the quantity proportion of the secondary particles in the first graphite.

The amount $C_3$ of the organic carbon source added in the coating process is a percentage of a weight of the organic carbon source added in the coating process in the total weight of the artificial graphite. In some implementations, $2\% \leq C_3 \leq 8\%$, $2\% \leq C_3 \leq 5\%$, $3\% \leq C_3 \leq 5\%$, or $2\% \leq C_3 \leq 3\%$.

In some implementations, in step (e), an amount $C_3$ of the organic carbon source that is added in the coating process, a volatile content $C_1$ of the coke raw material, an amount $C_2$ of the binder, and a particle size uniformity $U_2$ of the artificial graphite satisfy: $20\% \leq (C_1 + C_2 + C_3)/U_2 \times 100\% \leq 56\%$, for example, $30\% \leq (C_1 + C_2 + C_3)/U_2 \times 100\% \leq 48\%$ or $40\% \leq (C_1 + C_2 + C_3)/U_2 \times 100\% \leq 48\%$.

In some implementations, in step (e), the organic carbon source satisfies $1.2\% \leq C_3 \times$ carbon residue rate $\leq 2.5\%$; for example, $1.5\% \leq C_3 \times$ carbon residue rate $\leq 2.4\%$, $1.8\% \leq C_3 \times$ residual carbon rate $\leq 2.3\%$, or $2\% \leq C_3 \times$ carbon residue rate $\leq 2.2\%$.

When step (e) further satisfies the foregoing process condition, the particle size uniformity of the negative-electrode active material, the particle size specific surface area, and the quantity proportion of the secondary particles can be further optimized, thereby further improving the performance of the battery.

The carbon residue rate is a carbon residue rate of the organic carbon source, which can be measured by using an LP-5731 coal pitch coking value tester. For the testing, refer to GB/T268 "Test Method for Carbon Residues in Petroleum Products", and GB/T8727-2008 "Test Method for Coking Values of Coal Pitch Products".

Other negative-electrode active materials in the first negative-electrode active material can be obtained commercially or prepared by using a method known in the art.

In addition to the preparation method of the negative-electrode plate of this disclosure, other composition and preparation methods of the secondary battery of this disclosure are known. For example, the positive-electrode plate of this disclosure can be prepared by using the following preparation method: mixing and dispersing the positive-electrode active material, optionally a conductive agent, a binder, or the like in a solvent (for example, NMP), and stirring evenly and applying the resulting mixture on the positive-electrode current collector, followed by drying and cold pressing, to obtain a positive-electrode plate.

In some implementations, the negative-electrode plate, the positive-electrode plate, the separator, and the electrolyte may be assembled to form a secondary battery. As an example, the positive-electrode plate, the separator, and the negative-electrode plate may be made into an electrode assembly through a winding process or a lamination process. The electrode assembly is placed in an outer package, and the electrolyte is injected, followed by vacuum-packaging, standing, formation, shaping, and other steps, to obtain a secondary battery Optional technical features of the secondary battery of this disclosure are also applicable to the preparation method of this disclosure.

Apparatus

An embodiment of a third aspect of this disclosure provides an apparatus. The apparatus includes at least one of the secondary battery, the battery module, or the battery pack according to this disclosure. The secondary battery, the battery module, or the battery pack may be used as a power source of the apparatus, or an energy storage unit of the apparatus. The apparatus may be, but is not limited to, a mobile device (for example, a mobile phone or a notebook computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite, an energy storage system, and the like.

A secondary battery, a battery module, or a battery pack may be selected for the apparatus according to requirements for using the apparatus.

Figure 10:
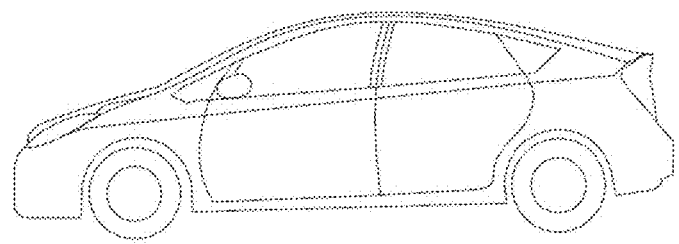
FIG. 10 is a schematic diagram of an apparatus using a secondary battery as a power source according to an embodiment of this disclosure.

FIG. 10 shows an apparatus in an example. The apparatus is a battery electric vehicle, a hybrid electric vehicle, a plug-in hybrid electric vehicle, or the like. To meet a requirement of the apparatus for high power and high energy density, a battery pack or a battery module may be used.

In another example, the apparatus may be a mobile phone, a tablet computer, a notebook computer, or the like. The apparatus is usually required to be light and thin, and the secondary battery may be used as a power source.

EXAMPLES

Content disclosed in this disclosure is described in more details in the following examples. These examples are intended only for illustrative purposes because various modifications and changes made without departing from the scope of the content disclosed in this disclosure are apparent to those skilled in the art. Unless otherwise stated, all parts, percentages, and ratios reported in the following embodiments are based on weights, all reagents used in the embodiments are commercially available or synthesized in a conventional manner, and can be used directly without further processing, and all instruments used in the embodiments are commercially available.

In the following Examples and Comparative Examples, the artificial graphite A and natural graphite that are used by the second negative-electrode active material, and the artificial graphite C and silicon monoxide SiO that are used in the first negative-electrode active material can be all obtained commercially, or can be prepared by using the following method. The artificial graphite B (that is, the first graphite) used in the first negative-electrode active material can be prepared by using the method described herein.

(I) Preparation of Artificial Graphite A

Non-needle petroleum coke was used and pulverized to obtain a petroleum coke raw material. Shaping and classification were performed on the petroleum coke raw material to obtain a precursor. Then, graphitization treatment was performed on the precursor at 2800° C.-3200° C., to obtain artificial graphite A.

In foregoing preparation method, optionally, granulation may be performed on the precursor by using a binder pitch, so as to adjust a morphology of particles of the artificial graphite A (for example, the percentage of the number of primary particle in the artificial graphite A may be adjusted).

In the foregoing process, through adjustment and controlling of the material preparation process, the artificial graphite A satisfied: 15 μm≤$D_v50$≤17.5 μm, and 40 μm≤$D_v99$≤55 μm, and the gram capacity was 353 mAh/g-370 mAh/g.

(II) Preparation of Artificial Graphite B

Petroleum coke was pulverized to obtain a petroleum coke raw material; shaping and classification were performed on the petroleum coke raw material to obtain a precursor; granulation was performed on the precursor by using a binder pitch; and graphitization treatment was performed on the granulated product at 2800° C.-3200° C., to obtain artificial graphite A. Then, the artificial graphite was coated with pitch, followed by graphitization treatment and sieving, to obtain artificial graphite B.

The foregoing procedure can be adjusted and controlled (refer to Table 2 for details) according to the foregoing preparation process of this disclosure, so that the artificial graphite B satisfies 8 μm≤$D_v50$≤13 μm, and $D_v99$≤23 μm; and the gram capacity is 348 mAh/g-360 mAh/g.

(III) Preparation of Artificial Graphite C

Non-needle petroleum green coke or petroleum calcined coke raw material was used. The raw material was pulverized, followed by shaping and classification, to obtain a precursor; granulation was performed on the precursor by using a binder pitch; and graphitization treatment was performed on the granulated product at a temperature of 2800° C.-3200° C., and artificial graphite was coated with pitch, followed by graphitization treatment and sieving, to obtain artificial graphite C.

In the foregoing process, through adjustment and controlling of the material preparation process, the artificial graphite C satisfied: 12 μm≤$D_v50$≤17 μm, and 25 μm≤$D_v99$≤45 μm, and the gram capacity was 350 mAh/g-360 mAh/g.

(IV) Natural graphite could be purchased from Shenzhen BTR New Energy Material Co., Ltd., and the natural graphite satisfied: 12 μm≤$D_v50$≤19 μm, and 24 μm≤$D_v99$≤37 μm, and the gram capacity was 360 mAh/g-370 mAh/g.

(V) Silicon monoxide SiO could be purchased from Shin-Etsu Chemical Co., Ltd.

Example 1

Preparation of the Negative-Electrode Plate

A second negative-electrode active material artificial graphite A, a conductive agent carbon black (Super P), a binder styrene-butadiene rubber (SBR), and a thickener sodium carboxymethyl cellulose (CMC-Na) were fully stirred and mixed in an appropriate amount of deionized water solvent at a mass ratio of 96:1.5:1.5:1, to form a uniform second negative-electrode slurry, where $D_v99^1$ of the second negative-electrode active material is 45.2 μm.

A first negative-electrode active material artificial graphite B, a conductive agent carbon black (Super P), a binder styrene-butadiene rubber (SBR), and a thickener sodium carboxymethyl cellulose (CMC-Na) were fully stirred and mixed in an appropriate amount of deionized water solvent at a mass ratio of 96:1.5:1.5:1, to form a uniform first negative-electrode slurry, where $D_v99^2$ of the first negative-electrode active material is 22.9 μm.

The second negative-electrode slurry and the first negative-electrode slurry were simultaneously extruded through a dual-chamber coating device. The second negative-electrode slurry was applied on a copper foil of the negative-electrode current collector to form a second negative-electrode film layer, and the first negative-electrode slurry was applied on the second negative-electrode film layer to form a first negative-electrode film layer, followed by drying and cold pressing, to obtain the negative-electrode plate. An areal density of the negative-electrode film layer was 0.123 mg/cm², a compacted density was 1.7 g/cm³, and a ratio of a thickness of the second negative-electrode film layer to that of the first negative-electrode film layer was 1:1.

Preparation of the Positive-Electrode Plate

A positive-electrode active material $LiNi_{0.8}Co_{0.1}Mn_{0.1}O_2$ (NCM811), a conductive agent Super P, and a binder polyvinylidene fluoride (PVDF) were fully stirred and mixed in an appropriate amount of N-methylpyrrolidone (NMP) solvent at a mass ratio of 97:1.5:1.5, to form a uniform positive-electrode slurry; and the positive-electrode slurry was applied on an aluminum foil of the positive-electrode current collector, followed by drying and cold pressing, to obtain a positive-electrode plate. An areal density of the positive-electrode film layer was 0.188 mg/cm², and a compacted density was 3.5 g/cm³.

Preparation of the Electrolyte

Ethylene carbonate (EC), ethyl methyl carbonate (EMC), and diethyl carbonate (DEC) are mixed at a volume ratio of 4:3:3, and then $LiPF_6$ was uniformly dissolved in the foregoing solution to obtain an electrolyte, where the concentration of $LiPF_6$ is 1 mol/L.

Separator

A PE separator was used.

Preparation of the Secondary Battery

A positive-electrode plate, a separator, and a negative-electrode plate were stacked in order and wound to obtain an electrode assembly. The electrode assembly was placed into an outer package, and the electrolyte was injected, followed by packaging, standing, formation, shaping, and other steps, to obtain a secondary battery.

Examples 2 to 30 and Comparative Examples 1 to 6

A corresponding second battery was obtained by using a preparation method similar to that in Example 1, with the only difference in related parameters used in preparation steps of the negative-electrode plate. For details, refer to Table 2 and Table 3.

Testing (1) Fast Charging Capability Testing for the Battery

At 25° C., batteries of the foregoing Examples and Comparative Examples were charged and discharged for the first time at a current of 1 C (that is, a current value at which a theoretical capacity was completely discharged in 1 h), In some embodiments including: the battery was charged to a voltage of 4.25V with a constant current at a 1 C rate, charged to a current of ≤0.05C at a constant voltage, left standing for 5 min, and then discharged to a voltage of 2.8V with a constant current at a 0.33C rate. An actual capacity was recorded as $C_0$.

Then, the batteries were charged to full-battery charging cut-off voltage 4.25V or 0V negative cut-off potential (whichever comes first) successively at a constant current of $1.0C_0$, $1.3C_0$, $1.5C_0$, $1.8C_0$, $2.0C_0$, $2.3C_0$, $2.5C_0$, and $3.0C_0$, and needed to be discharged to full-battery discharging cut-off voltage 2.8V at $1C_0$ after each charge was completed. Corresponding negative potentials for charging to 10%, 20%, 30%, ..., and 80% SOC (State of Charge, state of charge) at different charging rates were recorded, and charging rate-negative potential curves in different SOC states were drawn. Charging rates corresponding to the negative potential of 0V in different SOC states were obtained through linear fitting, and the charging rate was a charging window in the SOC state and was denoted by C10% SOC, C20% SOC, C30% SOC, C40% SOC, C50% SOC, C60% SOC, C70% SOC, and C80% SOC. According to a formula (60/C20% SOC+60/C30% SOC+60/C40% SOC+60/C50% SOC+60/C60% SOC+60/C70% SOC+60/C80% SOC)× 10%, a charging time T (min) for charging the battery from 10% SOC to 80% SOC (under the premise of no lithium precipitation of the battery) was obtained through calculation. A shorter time indicates better fast charging performance of the battery.

(2) Energy Storage Performance Testing for the Battery

At 25° C., secondary batteries prepared in the foregoing Examples and Comparative Examples were discharged to 2.8V with a constant current at a 1.0C rate, charged to 4.25V with a constant current at a 1.0C rate, and continued to be charged to a current of ≤0.05C at a constant voltage. At that time, the battery was fully charged, that is, 100% SOC. After being left standing for 5 min, the fully-charged battery was discharged to 2.8V with a constant current of 1.0C. The discharge capacity at that time was an actual capacity of the battery at 1C/1C, and denoted by $C_0$.

Then, at 25° C., the battery was charged to 4.25V with a constant current of $1C_0$, and continued to be charged at a constant voltage to a current of ≤0.05C. The battery at that time was in a fully-charged state. The fully-charged battery was stored in an environment of 60° C. According to a given capacity test procedure, the battery was taken out from time to time, the battery was discharged at 25° C. to 2.8V at a constant current of $1C_0$, charged to 4.25V at a constant current of $1C_0$, continued to be charged at a constant voltage to a current of ≤0.05C, left standing for 5 min, and then discharged to 2.8V at a constant current of LOC. The discharge capacity at that time was a reversible capacity after one storage period, and denoted by $C_n$; and a capacity retention rate of this storage period was $C_n/C_0 \times 100\%$. The storage test process was repeated until the capacity retention rate became 80%, and then a storage time (days) at that time was recorded.

It should be noted that, each time after the battery was taken out to test the capacity, the battery needed to be charged to 4.25V at $1C_0$, charged to a current of ≤0.05C at a constant voltage to make the battery in a fully charged state, and then stored at 60° C.

(3) Cycling Performance Testing for the Battery

At 25° C., secondary batteries prepared in the Examples and Comparative Examples were charged to a charging cut-off voltage 4.25V at a constant current of 0.33C, charged to a current of 0.05C at a constant voltage, left standing for 5 min, and then discharged to a discharging cut-off voltage of 2.8V at a constant current of 0.33C. An initial capacity thereof was recorded as $C_0$. Then, the batteries were charged according to strategies in Table 1, and discharged at 0.33C. A discharging capacity C. of each cycle was recorded, until a cycling capacity retention rate ($C_n/C_0 \times 100\%$) became 80%; and then the number of cycles was recorded. A larger quantity of cycles indicates a longer cycle life of the battery.

TABLE 1

| State of charge SOC of battery | Charging rate (C) |
|---|---|
| 0-10% | 0.33 |
| 10%-20% | 4 |
| 20%-30% | 3 |
| 30%-40% | 2.4 |
| 40%-50% | 2 |
| 50%-60% | 1.6 |
| 60%-70% | 1.4 |
| 70%-80% | 1 |
| 80%-100% | 0.33 |

For details about test results of Examples 1 to 30 and Comparative Examples 1 to 6, refer to Table 3.

TABLE 2

| | | Preparation parameters of artificial graphite B | | | | | | | | |
|---|---|---|---|---|---|---|---|---|---|---|
| | | Petroleum coke raw material | | | Precursor | | | Granulation | Graphitization | Coating | |
| Sequence number | Type | $D_v50$ (μm) | $D_v99$ (μm) | $C_1$ (%) | $D_v50$ (μm) | $D_v99$ (μm) | $C_1 + C_2$ (%) | $D_v99$ of granulated product (μm) | $D_v99$ of artificial graphite (μm) | $C_3$ × carbon residue rate (%) | $C_1 + C_2 + C3$ (%) |
| Example 1 | Non-needle petroleum green coke | 8.2 | 19.8 | 7.97 | 8.6 | 20.9 | 13.0 | 22.8 | 23.1 | 2.10 | 16.0 |
| Example 2 | Non-needle petroleum green coke | 7.8 | 19.3 | 7.86 | 8.2 | 20.0 | 12.9 | 21.8 | 21.3 | 2.10 | 15.9 |
| Example 3 | Non-needle petroleum green coke | 7.4 | 18.8 | 7.58 | 7.8 | 19.7 | 12.6 | 20.9 | 20.8 | 2.10 | 15.6 |
| Example 4 | Non-needle petroleum green coke | 7.2 | 18.3 | 7.12 | 7.6 | 18.9 | 12.1 | 19.9 | 19.5 | 2.10 | 15.1 |
| Example 5 | Non-needle petroleum green coke | 6.9 | 17.5 | 6.86 | 7.2 | 17.8 | 11.9 | 19.2 | 18.3 | 2.10 | 14.9 |
| Example 6 | Non-needle petroleum green coke | 6.6 | 16.8 | 6.52 | 6.9 | 17.2 | 11.5 | 18.7 | 17.9 | 2.10 | 14.5 |
| Example 7 | Non-needle petroleum green coke | 5.5 | 18.8 | 7.58 | 5.9 | 19.7 | 12.6 | 20.9 | 20.8 | 2.10 | 15.6 |
| Example 8 | Non-needle petroleum green coke | 6.1 | 18.8 | 7.58 | 6.6 | 19.7 | 12.6 | 20.9 | 20.8 | 2.10 | 15.6 |
| Example 9 | Non-needle petroleum green coke | 6.4 | 18.8 | 7.58 | 6.9 | 19.7 | 12.6 | 20.9 | 20.8 | 2.10 | 15.6 |
| Example 10 | Non-needle petroleum green coke | 7.0 | 18.8 | 7.58 | 7.4 | 19.7 | 12.6 | 20.9 | 20.8 | 2.10 | 15.6 |
| Example 11 | Non-needle petroleum green coke | 7.3 | 18.8 | 7.58 | 7.7 | 19.7 | 12.6 | 20.9 | 20.8 | 2.00 | 15.6 |
| Example 18 | Non-needle petroleum calcined coke | 7.3 | 18.8 | 4.58 | 7.7 | 19.7 | 8.8 | 20.9 | 20.8 | 2.10 | 11.8 |
| Example 19 | Non-needle petroleum calcined coke + non-needle petroleum green coke | 7.3 | 18.8 | 5.54 | 7.7 | 17.9 | 9.8 | 18.6 | 20.1 | 2.20 | 12.8 |

TABLE 2-continued

Preparation parameters of artificial graphite B

| | Petroleum coke raw material | | | | Precursor | | | Granulation $D_v99$ of granulate ($\mu m$) | Graphitization $D_v99$ of artificial d product ($\mu m$) | Coating | |
|---|---|---|---|---|---|---|---|---|---|---|---|
| Sequence number | Type | $D_v50$ ($\mu m$) | $D_v99$ ($\mu m$) | $C_1$ (%) | $D_v50$ ($\mu m$) | $D_v99$ ($\mu m$) | $C_1 + C_2$ (%) | | graphite ($\mu m$) | $C_3 \times$ carbon residue rate (%) | $C_1 + C_2 + C3$ (%) |
| Example 20 | Non-needle petroleum calcined coke + non-needle petroleum green coke | 7.3 | 18.8 | 6.54 | 7.7 | 17.9 | 11.2 | 18.6 | 20.1 | 2.20 | 14.2 |
| Example 21 | Non-needle petroleum calcined coke + non-needle petroleum green coke | 7.3 | 18.8 | 7.14 | 7.7 | 18.5 | 12.1 | 19.2 | 20.6 | 2.10 | 15.1 |
| Example 22 | Non-needle petroleum green coke | 7.3 | 18.8 | 7.58 | 7.7 | 18.3 | 14.6 | 22.3 | 23.5 | 1.22 | 17.6 |

TABLE 3

| | Second negative-electrode film layer (lower film layer) Second positive-electrode active material | | | | First negative-electrode film layer (upper film layer) First positive-electrode active material | | | | | Fast-charging capability of battery (min) | Energy storage perfomance of battery (days) | Cycling perfomance of battery (cycles) |
|---|---|---|---|---|---|---|---|---|---|---|---|---|
| Sequence number | Type | $D_v99^1$ ($\mu m$) | $D_v50$ ($\mu m$) | Quantity proportion of the primary particles | Type | $D_v99^2$ ($\mu m$) | $D_v50$ ($\mu m$) | Quantity proportion of the secondary particles | $D_v99^1/D_v99^2$ | | | |
| Example 1 | Artificial graphite A | 45.2 | 16.5 | 90% | Artificial graphite B | 22.9 | 12.5 | 90% | 1.97 | 23.4 | 622 | 2212 |
| Example 2 | Artificial graphite A | 45.2 | 16.5 | 90% | Artificial graphite B | 21.1 | 11.9 | 90% | 2.14 | 22.1 | 619 | 2231 |
| Example 3 | Artificial graphite A | 45.2 | 16.5 | 90% | Artificial graphite B | 20.6 | 11.7 | 90% | 2.19 | 21.3 | 617 | 2239 |
| Example 4 | Artificial graphite A | 45.2 | 16.5 | 90% | Artificial graphite B | 19.2 | 11.4 | 90% | 2.35 | 20.5 | 615 | 2247 |
| Example 5 | Artificial graphite A | 45.2 | 16.5 | 90% | Artificial graphite B | 18.1 | 11.0 | 90% | 2.50 | 19.6 | 611 | 2264 |
| Example 6 | Artificial graphite A | 45.2 | 16.5 | 90% | Artificial graphite B | 17.6 | 10.4 | 90% | 2.57 | 19.1 | 596 | 2301 |
| Example 7 | Artificial graphite A | 45.2 | 16.5 | 90% | Artificial graphite B | 20.6 | 8.5 | 90% | 2.19 | 18.5 | 565 | 2357 |
| Example 8 | Artificial graphite A | 45.2 | 16.5 | 90% | Artificial graphite B | 20.6 | 9.3 | 90% | 2.19 | 19.2 | 579 | 2323 |
| Example 9 | Artificial graphite A | 45.2 | 16.5 | 90% | Artificial graphite B | 20.6 | 10.2 | 90% | 2.19 | 19.8 | 585 | 2316 |
| Example 10 | Artificial graphite A | 45.2 | 16.5 | 90% | Artificial graphite B | 20.6 | 11.1 | 90% | 2.19 | 20.4 | 597 | 2269 |
| Example 11 | Artificial graphite A | 45.2 | 16.5 | 90% | Artificial graphite B | 20.6 | 11.5 | 90% | 2.19 | 20.8 | 609 | 2251 |

TABLE 3-continued

| | Second negative-electrode film layer (lower film layer) Second positive-electrode active material | | | | First negative-electrode film layer (upper film layer) First positive-electrode active material | | | | | Fast-charging capability of battery (min) | Energy storage perfomance of battery (days) | Cycling perfomance of battery (cycles) |
|---|---|---|---|---|---|---|---|---|---|---|---|---|
| Sequence number | Type | $D_v 99^1$ (μm) | $D_v 50$ (μm) | Quantity proportion of the primary particles | Type | $D_v 99^2$ (μm) | $D_v 50$ (μm) | Quantity proportion of the secondary particles | $D_v 99^1/ D_v 99^2$ | | | |
| Example 12 | Artificial graphite A | 45.2 | 16.5 | 30% | Artificial graphite B | 20.6 | 11.7 | 90% | 2.19 | 18.2 | 526 | 2283 |
| Example 13 | Artificial graphite A | 45.2 | 16.5 | 55% | Artificial graphite B | 20.6 | 11.7 | 90% | 2.19 | 18.7 | 534 | 2271 |
| Example 14 | Artificial graphite A | 45.2 | 16.5 | 65% | Artificial graphite B | 20.6 | 11.7 | 90% | 2.19 | 19.1 | 542 | 2269 |
| Example 15 | Artificial graphite A | 45.2 | 16.5 | 75% | Artificial graphite B | 20.6 | 11.7 | 90% | 2.19 | 19.7 | 593 | 2258 |
| Example 16 | Artificial graphite A | 45.2 | 16.5 | 85% | Artificial graphite B | 20.6 | 11.7 | 90% | 2.19 | 20.2 | 612 | 2243 |
| Example 17 | Artificial graphite A | 45.2 | 16.5 | 98% | Artificial graphite B | 20.6 | 11.7 | 90% | 2.19 | 21.5 | 630 | 2220 |
| Example 18 | Artificial graphite A | 45.2 | 16.5 | 90% | Artificial graphite B | 20.6 | 11.7 | 55% | 2.19 | 23.8 | 652 | 2153 |
| Example 19 | Artificial graphite A | 45.2 | 16.5 | 90% | Artificial graphite B | 20.6 | 11.7 | 65% | 2.19 | 22.6 | 642 | 2189 |
| Example 20 | Artificial graphite A | 45.2 | 16.5 | 90% | Artificial graphite B | 20.6 | 11.7 | 75% | 2.19 | 21.9 | 636 | 2200 |
| Example 21 | Artificial graphite A | 45.2 | 16.5 | 90% | Artificial graphite B | 20.6 | 11.7 | 85% | 2.19 | 21.5 | 633 | 2221 |
| Example 22 | Artificial graphite A | 45.2 | 16.5 | 90% | Artificial graphite B | 20.6 | 11.7 | 95% | 2.19 | 20.4 | 611 | 2252 |
| Example 23 | Artificial graphite A | 52.3 | 16.9 | 90% | Artificial graphite B | 20.6 | 11.7 | 90% | 2.54 | 23.4 | 631 | 2123 |
| Example 24 | Artificial graphite A | 50.1 | 16.8 | 90% | Artificial graphite B | 20.6 | 11.7 | 90% | 2.43 | 22.7 | 626 | 2156 |
| Example 25 | Artificial graphite A | 48.7 | 16.6 | 90% | Artificial graphite B | 20.6 | 11.7 | 90% | 2.36 | 21.6 | 621 | 2186 |
| Example 26 | Artificial graphite A | 44.5 | 16.1 | 90% | Artificial graphite B | 20.6 | 11.7 | 90% | 2.16 | 20.2 | 613 | 2258 |
| Example 27 | Artificial graphite A | 41.6 | 15.9 | 90% | Artificial graphite B | 20.6 | 11.7 | 90% | 2.02 | 19.7 | 605 | 2286 |
| Example 28 | 60% artificial graphite A + 40% natural graphite | 42.2 | 17.3 | 90% | Artificial graphite B | 20.6 | 11.7 | 90% | 2.05 | 18.5 | 513 | 1846 |
| Example 29 | 80% artificial graphite A + 20% natural graphite | 43.1 | 16.7 | 90% | Artificial graphite B | 20.6 | 11.7 | 90% | 2.09 | 18.2 | 539 | 1733 |
| Example 30 | Artificial graphite A | 45.2 | 16.5 | 90% | 95% artificial graphite B + 5% silicon monoxide SiO | 19.9 | 11.4 | 90% | 2.27 | 20.6 | 521 | 1621 |

TABLE 3-continued

| | Second negative-electrode film layer (lower film layer) Second positive-electrode active material | | | | First negative-electrode film layer (upper film layer) First positive-electrode active material | | | | | Fast-charging capability of battery (min) | Energy storage perfomance of battery (days) | Cycling perfomance of battery (cycles) |
|---|---|---|---|---|---|---|---|---|---|---|---|---|
| Sequence number | Type | $D_v99^1$ (μm) | $D_v50$ (μm) | Quantity proportion of the primary particles | Type | $D_v99^2$ (μm) | $D_v50$ (μm) | Quantity proportion of the secondary particles | $D_v99^1/D_v99^2$ | | | |
| Comparative Example 1 | Artificial graphite A | 45.2 | 16.5 | 90% | Artificial graphite C | 35.2 | 11.7 | 90% | 1.28 | 35.2 | 612 | 2054 |
| Comparative Example 2 | 60% artificial graphite A + 40% natural graphite | 42.2 | 17.3 | 90% | Artificial graphite C | 35.2 | 11.7 | 90% | 1.20 | 28.3 | 522 | 1554 |
| Comparative Example 3 | 80% artificial graphite A + 20% natural graphite | 43.1 | 16.7 | 90% | Artificial graphite C | 35.2 | 11.7 | 90% | 1.22 | 29.8 | 546 | 1623 |
| Comparative Example 4 | Artificial graphite A | 45.2 | 16.5 | 90% | Artificial graphite C | 37.5 | 16.5 | 90% | 1.21 | 36.2 | 636 | 1989 |
| Comparative Example 5 | 60% artificial graphite A + 40% natural graphite | 42.2 | 17.3 | 90% | Artificial graphite C | 37.5 | 16.5 | 90% | 1.13 | 33.9 | 557 | 1533 |
| Comparative Example 6 | 80% artificial graphite A + 20% natural graphite | 43.1 | 16.7 | 90% | Artificial graphite C | 37.5 | 16.5 | 90% | 1.15 | 34.7 | 574 | 1496 |

It can be learned from the results of Table 3 that the secondary batteries in the Examples of this disclosure use a negative-electrode plate of a multi-layer film structure, and the first negative-electrode film layer located at an upper layer includes the first negative-electrode active material, satisfying the first negative-electrode active material including the first graphite and $D_v99$ of the first negative-electrode active material being ≤23 μm, so that the battery can be charged at a high rate in a high SOC state, thereby significantly improving the fast-charging capability. In addition, the battery can further have both higher cycling performance and higher energy storage performance.

The batteries of Comparative Examples 1 to 6 do not satisfy the foregoing conditions, and have relatively poor fast-charging capability and relatively short cycle life, not good for improving the energy storage performance.

The foregoing descriptions are merely specific embodiments of this disclosure, but are not intended to limit the protection scope of this disclosure. Any equivalent modifications or replacements readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A secondary battery, comprising a negative-electrode plate, wherein the negative-electrode plate comprises a negative-electrode current collector and a negative-electrode film layer, the negative-electrode film layer comprising a first negative-electrode film layer and a second negative-electrode film layer, wherein
   the second negative-electrode film layer is located between the negative-electrode current collector and the first negative-electrode film layer;
   the first negative-electrode film layer comprises a first negative-electrode active material, the first negative-electrode active material comprising a first graphite, the first graphite being artificial graphite, and a distribution of volume-based particle size $D_v99$ of the first negative-electrode active material is 17 μm≤$D_v99$≤23 μm; and
   the second negative-electrode film layer comprises a second negative-electrode active material comprising a second graphite, and a distribution of volume-based particle size Dv99 of the second negative-electrode active material is greater than the distribution of volume-based particle size Dv99 of the first negative-electrode active material.

2. The secondary battery according to claim 1, wherein the first negative-electrode active material satisfies 18 μm≤Dv99≤21 μm.

3. The secondary battery according to claim 1, wherein the first negative-electrode active material satisfies 8 μm≤$D_v50$≤13 μm.

4. The secondary battery according to claim 1, wherein a particle size uniformity of the first negative-electrode active material is 0.28-0.4.

5. The secondary battery according to claim 1, wherein the first graphite comprises secondary particles, a number percentage of the secondary particles in the first graphite is ≥50%.

6. The secondary battery according to claim 1, wherein a particle size specific surface area of the first negative-electrode active material is 0.45 m²/g-0.65 m²/g.

7. The secondary battery according to claim 1, wherein the first negative-electrode active material satisfies: 0.6≤ ($D_v90-D_v10)/D_v50$≤1.8.

8. The secondary battery according to claim 1, wherein a distribution of volume-based particle size $D_v10$ of the first negative-electrode active material is 5 μm-9 μm; or
a distribution of volume-based particle size $D_v90$ of the first negative-electrode active material is 14 μm-21 μm.

9. The secondary battery according to claim 1, wherein the first negative-electrode active material further satisfies one or more of the following (1) to (5):
(1) a powder OI value of the first negative-electrode active material is 2.0-4.0;
(2) a tap density of the first negative-electrode active material is 0.85 g/cm³-1.4 g/cm³;
(3) a powder compacted density of the first negative-electrode active material under a pressure of 2 kN is 1.55 g/cm³-1.70 g/cm³;
(4) a specific surface area (SSA) of the first negative-electrode active material is 0.8 m²/g-1.3 m²/g; and
(5) a gram capacity of the first negative-electrode active material is 345 mAh/g-360 mAh/g.

10. The secondary battery according to claim 1, wherein at least part of a surface of the first graphite is provided with an amorphous carbon coating layer.

11. The secondary battery according to claim 1, wherein a mass percentage of the first graphite in the first negative-electrode active material is ≥80%.

12. The secondary battery according to claim 1, wherein the second graphite comprises one or more of artificial graphite and natural graphite.

13. The secondary battery according to claim 1, wherein the distribution of volume-based particle size $D_v99$ of the second negative-electrode active material is 41.6 μm≤Dv99≤52.3 μm.

14. The secondary battery according to claim 1, wherein a ratio of the distribution of volume-based particle size $D_v99$ of the second negative-electrode active material to the distribution of volume-based particle size $D_v99$ of the first negative-electrode active material is 2.0-2.6.

15. The secondary battery according to claim 1, wherein the second negative-electrode active material further satisfies the following (1) to (5):
(1) a mass percentage of the artificial graphite in the second graphite is ≥50%;
(2) a volume-based median particle size $D_v50$ of the second negative-electrode active material is 15 μm-21 μm;
(3) a particle size uniformity of the second negative-electrode active material is 0.3-0.55;
(4) the second graphite comprises primary particles, a number percentage of the primary particles in the second graphite is ≥50%;
(5) a particle size specific surface area of the second negative-electrode active material is 0.35 m²/g-0.55 m²/g.

16. The secondary battery according to claim 12, wherein the second negative-electrode active material further satisfies the following (1) to (8):
(1) the second negative-electrode active material satisfies: 0.9≤($D_v90-D_v10)/D_v50$≤1.6;
(2) a distribution of volume-based particle size $D_v10$ of the second negative-electrode active material is 5 μm-14 μm;
(3) a distribution of volume-based particle size $D_v90$ of the second negative-electrode active material is 24 μm-38 μm;
(4) a powder OI value of the second negative-electrode active material is ≤14;
(5) a tap density of the second negative-electrode active material is 0.8 g/cm³-1.2 g/cm³;
(6) a powder compacted density of the second negative-electrode active material under a pressure of 2 kN is 1.70 g/cm³-1.85 g/cm³;
(7) a specific surface area (SSA) of the second negative-electrode active material is 1.0 m²/g-2.0 m²/g; and
(8) a gram capacity of the second negative-electrode active material is 353 mAh/g-370 mAh/g.

17. The secondary battery according to claim 1, wherein the negative-electrode film layer further satisfies the following (1) to (3):
(1) an areal density of the negative-electrode film layer is 0.117 mg/mm²-0.130 mg/mm²;
(2) a compacted density of the negative-electrode film layer is 1.65 g/cm³-1.75 g/cm³; and
(3) a thickness ratio of the second negative-electrode film layer to the first negative-electrode film layer is 0.7:1-2.3:1.

18. The secondary battery according to claim 12, wherein the first negative-electrode active material or the second negative-electrode active material further comprises one or more of silicon-based material, tin-based material, soft carbon, hard carbon, and lithium titanate.

19. The secondary battery according to claim 1, wherein the secondary battery comprises a positive-electrode plate, the positive-electrode plate comprises a positive-electrode current collector and a positive-electrode film layer that is disposed on at least one surface of the positive-electrode current collector and that comprises a positive-electrode active material, the positive-electrode active material comprises one or more of lithium transition metal oxide, olivine-structured lithium-containing phosphate, and respective modified compounds thereof.

20. An apparatus, comprising the secondary battery according to claim 1.

* * * * *